United States Patent
Steinmetz et al.

(10) Patent No.: US 9,976,052 B2
(45) Date of Patent: May 22, 2018

(54) AQUEOUS COATING COMPOSITION AND PRODUCTION OF MULTICOAT PAINT SYSTEMS USING SAID COATING COMPOSITION

(71) Applicant: BASF Coatings GmbH, Muenster (DE)

(72) Inventors: Bernhard Steinmetz, Ruetschenhausen (DE); Nadia Luhmann, Karlstadt-Stetten (DE); Peggy Jankowski, Guentersleben (DE); Michael Matura, Kitzingen (DE); Hardy Reuter, Muenster (DE); Peter Hoffmann, Senden (DE)

(73) Assignee: BASF Coatings GmbH, Muenster (DE)

( * ) Notice: Subject to any disclaimer, the term of this patent is extended or adjusted under 35 U.S.C. 154(b) by 23 days.

(21) Appl. No.: 15/106,069

(22) PCT Filed: Dec. 11, 2014

(86) PCT No.: PCT/EP2014/077348
§ 371 (c)(1),
(2) Date: Jun. 17, 2016

(87) PCT Pub. No.: WO2015/091194
PCT Pub. Date: Jun. 25, 2015

(65) Prior Publication Data
US 2016/0319151 A1  Nov. 3, 2016

(30) Foreign Application Priority Data
Dec. 18, 2013 (EP) .................................... 13197947

(51) Int. Cl.
| | | |
|---|---|---|
| *C09D 151/08* | (2006.01) | |
| *B05D 7/00* | (2006.01) | |
| *C08F 290/14* | (2006.01) | |
| *C08G 18/08* | (2006.01) | |
| *C09D 175/14* | (2006.01) | |
| *C09D 175/16* | (2006.01) | |
| *C08G 18/42* | (2006.01) | |

(52) U.S. Cl.
CPC ........... *C09D 151/08* (2013.01); *B05D 7/572* (2013.01); *C08F 290/147* (2013.01); *C08G 18/0823* (2013.01); *C08G 18/4233* (2013.01); *C09D 175/14* (2013.01); *C09D 175/16* (2013.01); *C08L 2666/20* (2013.01)

(58) Field of Classification Search
CPC .. C08F 290/147; C08F 220/14; C08F 220/18; C08F 220/40; C08F 2220/1825; B05D 7/572; C08G 18/0823; C08G 18/4233; C08L 2666/20; C09D 151/08; C09D 175/14; C09D 175/16
USPC .................... 428/423.1; 528/45, 65, 66, 74.5
See application file for complete search history.

(56) References Cited

U.S. PATENT DOCUMENTS

| | | | |
|---|---|---|---|
| 6,372,875 B1 * | 4/2002 | Mayer ................ | C08G 18/0819 428/425.8 |
| 2013/0197152 A1 | 8/2013 | Herve et al. | |
| 2015/0064476 A1 * | 3/2015 | Kanda .................... | C09D 5/00 428/423.1 |

FOREIGN PATENT DOCUMENTS

| | | |
|---|---|---|
| DE | 1 198 348 B | 6/1961 |
| DE | 1 768 313 B | 4/1968 |
| DE | 2 234 265 B | 7/1972 |
| DE | 39 03 804 A1 | 8/1990 |
| DE | 40 09 858 A1 | 10/1991 |
| DE | 44 37 535 A1 | 4/1996 |
| DE | 199 30 665 A1 | 1/2001 |
| DE | 199 48 004 A1 | 7/2001 |
| DE | 100 43 405 C1 | 6/2002 |

(Continued)

OTHER PUBLICATIONS

International Search Report dated Feb. 13, 2015 for PCT/EP2014/077348 filed on Dec. 11, 2014.

*Primary Examiner* — Thao T Tran
(74) *Attorney, Agent, or Firm* — Oblon, McClelland, Maier & Neustadt, L.L.P.

(57) ABSTRACT

The present invention relates to an aqueous coating composition comprising at least one aqueous dispersion comprising at least one copolymer (CP), said copolymer (CP) being preparable by (i) initially charging an aqueous dispersion of at least one polyurethane, and then (ii) polymerizing a mixture of olefinically unsaturated monomers in the presence of the polyurethane from (i), in which (a) a water-soluble initiator is used, (b) the olefinically unsaturated monomers are metered in such that a concentration of 6.0% by weight, based on the total amount of olefinically unsaturated monomers used for polymerization, in the reaction solution is not exceeded over the entire reaction time, and (c) the mixture of the olefinically unsaturated monomers comprises at least one polyolefinically unsaturated monomer, at least one linear hydroxy-functional reaction product (R) having an acid number less than 20 mg KOH/g, the preparation of which involves using at least one compound (v) containing two functional groups (v.a) and an aliphatic or araliphatic hydrocarbyl radical (v.b) which is arranged between the functional groups and has 12 to 70 carbon atoms, and at least one polyurethane resin (X), the preparation of which involves using at least one compound (x.1) containing at least one carboxylic acid group and at least one group reactive toward isocyanate groups. The present invention also relates to a method for producing a multicoat paint system using the coating composition, and to the multicoat coating thus produced.

20 Claims, No Drawings

(56) References Cited

FOREIGN PATENT DOCUMENTS

| | | |
|---|---|---|
| EP | 0 228 003 A1 | 7/1987 |
| EP | 0 634 431 A1 | 1/1995 |
| EP | 1 534 792 131 B1 | 5/2007 |
| WO | 91/13918 A1 | 9/1991 |
| WO | 91/15528 A1 | 10/1991 |
| WO | 92/15405 A1 | 9/1992 |
| WO | 02/46321 A2 | 6/2002 |

\* cited by examiner

AQUEOUS COATING COMPOSITION AND PRODUCTION OF MULTICOAT PAINT SYSTEMS USING SAID COATING COMPOSITION

CROSS-REFERENCES TO RELATED APPLICATIONS

This application is a National Stage of PCT/EP2014/077348, which was filed on Dec. 11, 2014. This application is based upon and claims the benefit of priority to European Application No. 13197947.8, which was filed on Dec. 18, 2013.

The present invention relates to an aqueous coating composition comprising a copolymer, a hydroxy-functional reaction product and a polyurethane resin. The present invention also relates to a method for producing multicoat paint systems using the aqueous coating composition, and also to the multicoat paint systems producible by means of said method. In addition, the present invention relates to the use of the aqueous coating composition for improving the stability of multicoat paint systems to visual defects, especially pinholes.

PRIOR ART

A multiplicity of methods are known for producing multicoat color and/or effect paint systems. The prior art discloses (cf., for example, German patent application DE 199 48 004 A1, page 17 line 37 to page 19 line 22, or German patent DE 100 43 405 C1, column 3 paragraph [0018], and column 8 paragraph [0052] to column 9 paragraph [0057], in conjunction with column 6 paragraph [0039] to column 8 paragraph [0050]), for example, the following method in which:

(1) a pigmented aqueous basecoat material is applied to a substrate,
(2) a polymer film is formed from the coating material applied in stage (1),
(3) a clearcoat material is applied to the resulting basecoat film, and then
(4) the basecoat film is cured together with the clearcoat film.

This method is widely employed, for example, for the OEM finishing of automobiles, and also for the painting of metal and plastic ancillary components. The methods described can be used to produce different multicoat paint systems which are able to achieve different performance properties, but are still in need of improvement in some aspects. A recurrent problem with multicoat paint systems in the automotive industry is that the visual quality, which is very important for automobiles in particular and is subject to a high level of quality control, is not always achieved. The visual quality of a multicoat paint system is guided not only by properties such as gloss or distinctness of image (DOI), but especially by the number of localized optical defects.

Particularly such localized defects, which are perceptible by eye as discrete defects, are very noticeable within an otherwise homogeneous paint surface and distinctly lower the visual quality. In this context, particular mention should be made of pinholes. As is well known, these arise particularly in the production of multicoat paint systems through unwanted inclusions of air, solvent and/or moisture in the course of the processes for application of coating compositions. These inclusions may become perceptible in the form of bubbles below the surface of the overall paint system and can break open in the curing operation which then follows. The holes formed are also referred to as pinholes. The higher the film thickness selected for the coating compositions, the greater the amount of air, organic solvents and/or water that has to escape from the films applied. Accordingly, the tendency to form pinholes also increases at the same time. The film thickness over and above which pinholes occur (pinhole limit) can accordingly serve as evidence of stability against pinholes, just like the number of pinholes for a given film thickness.

Particular performance properties of multicoat paint systems can be influenced, for example, through the controlled matching and combination of specific components, such as binders or additives, in the coating compositions used for production of the paint systems.

Problem and Technical Solution

The problem addressed by the present invention was thus that of improving the stability of multicoat paint systems to visual defects, especially pinholes. In this way, it was to be possible, more particularly, to satisfy the ever-growing demands from the automobile manufacturers on the performance properties of multicoat paint systems.

It has been found that the stated problems have been solved by an aqueous coating composition comprising
at least one aqueous dispersion comprising at least one copolymer (CP), said copolymer (CP) being preparable by
  (i) initially charging an aqueous dispersion of at least one polyurethane, and then
  (ii) polymerizing a mixture of olefinically unsaturated monomers in the presence of the polyurethane from (i), in which
    (a) a water-soluble initiator is used,
    (b) the olefinically unsaturated monomers are metered in such that a concentration of 6.0% by weight, based on the total amount of olefinically unsaturated monomers used for polymerization, in the reaction solution is not exceeded over the entire reaction time, and
    (c) the mixture of the olefinically unsaturated monomers comprises at least one polyolefinically unsaturated monomer,
at least one linear hydroxy-functional reaction product (R) having an acid number less than 20 mg KOH/g, the preparation of which involves using at least one compound (v) containing two functional groups (v.a) and an aliphatic or araliphatic hydrocarbyl radical (v.b) which is arranged between the functional groups and has 12 to 70 carbon atoms,
and
at least one polyurethane resin (X), the preparation of which involves using at least one compound (x.1) containing at least one carboxylic acid group and at least one group reactive toward isocyanate groups.

The novel aqueous coating composition is also referred to hereinafter as coating composition of the invention. Preferred embodiments of the coating composition of the invention are apparent from the description which follows and from the dependent claims.

The present invention also provides a method for producing multicoat paint systems using the aqueous coating composition, and to the multicoat paint systems producible by means of said method. In addition, the present invention relates to the use of the aqueous coating composition for improving the stability of multicoat paint systems to visual defects, especially pinholes.

It has been found that the use of the coating composition of the invention for production of paint systems, especially multicoat paint systems, can distinctly improve the stability of these paint systems to visual defects. The use of the aqueous coating composition as a basecoat material especially achieves excellent stability to pinholes in the resulting multicoat paint system.

DETAILED DESCRIPTION

The Coating Composition of the Invention

The coating composition of the invention comprises a specific aqueous dispersion comprising at least one specific copolymer (CP), preferably exactly one copolymer (CP).

A copolymer in the context of the present invention refers to polymers formed from different polymer types, for example a polyurethane and a (meth)acrylate polymer. This explicitly includes both polymers covalently bonded to one another and those in which the various polymers are bonded to one another by adhesion. Combinations of both kinds of bonding are also covered by this definition. The term "(meth)acrylate" covers acrylates, methacrylates and mixtures thereof.

The copolymer (CP) is preparable by
(i) initially charging an aqueous dispersion of at least one polyurethane, and then
(ii) polymerizing a mixture of olefinically unsaturated monomers in the presence of the polyurethane from (i), in which
  a. a water-soluble initiator is used,
  b. the olefinically unsaturated monomers are metered in such that a concentration of 6.0% by weight, based on the total amount of olefinically unsaturated monomers used for polymerization, in the reaction solution is not exceeded over the entire reaction time, and
  c. the mixture of the olefinically unsaturated monomers comprises at least one polyolefinically unsaturated monomer.

In the first preparation step, an aqueous dispersion of a polyurethane resin is initially charged.

Suitable saturated or unsaturated polyurethane resins are described, for example, in German patent application DE 199 48 004 A1, page 4 line 19 to page 11 line 29 (polyurethane prepolymer B1), European patent application EP 0 228 003 A1, page 3 line 24 to page 5 line 40, European patent application EP 0 634 431 A1, page 3 line 38 to page 8 line 9, or international patent application WO 92/15405, page 2 line 35 to page 10 line 32.

The polyurethane resin is prepared using firstly, preferably, the aliphatic, cycloaliphatic, aliphatic-cycloaliphatic, aromatic, aliphatic-aromatic and/or cycloaliphatic-aromatic polyisocyanates known to those skilled in the art. Particular preference is given to aliphatic and aliphatic-cycloaliphatic polyurethane resins.

The alcohol components used for the preparation of the polyurethane resins are preferably the saturated and unsaturated polyols known to those skilled in the art, and optionally, in minor amounts, also monoalcohols. More particularly, diols and, optionally in minor amounts, triols are used to introduce branches. Examples of suitable polyols are saturated or olefinically unsaturated polyester polyols and/or polyether polyols. More particularly, the polyols used are polyester polyols, especially those having a number-average molecular weight of 400 to 5000 g/mol. Unless specifically indicated otherwise, the number-average molecular weight in the context of the present invention is determined by means of vapor pressure osmosis. Measurement was effected using a vapor pressure osmometer (model 10.00 from. Knauer) on concentration series of the component under investigation in toluene at 50° C., with benzophenone as calibration substance for determination of the experimental calibration constant of the instrument employed (in accordance with E. Schröder, G. Müller, K.-F. Arndt, "Leitfaden der Polymercharakterisierung" [Introduction to polymer characterization], Akademie-Verlag, Berlin, pp. 47-54, 1982, in which benzil was used as calibration substance).

The polyurethane initially charged in aqueous dispersion is preferably a hydrophilically stabilized polyurethane. For hydrophilic stabilization and/or to increase dispersibility in aqueous medium, the polyurethane resin preferably present may contain particular ionic groups and/or groups which can be converted to ionic groups (potentially ionic groups). Polyurethane resins of this kind are referred to in the context of the present invention as ionically hydrophilically stabilized polyurethane resins. Likewise present may be nonionic hydrophilically modifying groups. Preferred, however, are the ionically hydrophilically stabilized polyurethanes. In more precise terms, the modifying groups are alternatively functional groups which can be converted to cations by neutralizing agents and/or quaternizing agents, and/or cationic groups (cationic modification)

or functional groups which can be converted to anions by neutralizing agents, and/or anionic groups (anionic modification)

or nonionic hydrophilic groups (nonionic modification)

or combinations of the aforementioned groups.

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which can be converted to cationic groups by neutralizing agents and/or quaternizing agents). Mention should also be made of the cationic groups—groups prepared from the aforementioned functional groups using neutralizing agents and/or quaternizing agents known to those skilled in the art—such as primary, secondary, tertiary and/or quaternary ammonium groups, tertiary sulfonium groups and/or quaternary phosphonium groups, more particularly quaternary ammonium groups and tertiary sulfonium groups.

As is well known, the functional groups for anionic modification are, for example, carboxylic acid, sulfonic acid and/or phosphonic acid groups, more particularly carboxylic acid groups (functional groups which can be converted to anionic groups by neutralizing agents), and also anionic groups—groups prepared from the aforementioned functional groups using neutralizing agents known to the skilled person—such as carboxylate, sulfonate and/or phosphonate groups.

The functional groups for nonionic hydrophilic modification are preferably poly(oxyalkylene) groups, more particularly poly(oxyethylene) groups.

The ionically hydrophilic modifications can be introduced into the polyurethane resin through monomers which contain the ionic or potentially ionic groups. The nonionic modifications are introduced, for example, through the incorporation of poly(ethylene) oxide polymers as lateral or terminal groups in the polyurethane molecules. The hydrophilic modifications are introduced, for example, via compounds which contain at least one group reactive toward isocyanate groups, preferably at least one hydroxyl group. The ionic modification can be introduced using monomers which, as well as the modifying groups, contain at least one hydroxyl group. To introduce the nonionic modifications, preference is given to using the polyether diols and/or alkoxypoly(oxyalkylene) alcohols known to those skilled in the art.

Preference is given to adding at least one organic solvent to the initially charged polyurethane dispersion, said organic solvent preferably being miscible in any ratio with water and in any ratio with the mixture of olefinically unsaturated monomers. Suitable organic solvents are N-methylpyrrolidone, N-ethylpyrrolidone and ether alcohols, such as methoxypropanol in particular, though it should be noted that pyrrolidone-based solvents may be dispensed with for environmental reasons alone. However, the amount of the organic solvent is selected such that the aqueous character of the dispersion is conserved.

In the second preparation step, a polymerization of a mixture of olefinically unsaturated monomers in the presence of the polyurethane is conducted by the methods of what is called free-radical emulsion polymerization in the presence of at least one polymerization initiator.

The polymerization initiator used has to be a water-soluble initiator. Examples of suitable initiators are potassium peroxodisulfate, sodium peroxodisulfate or ammonium peroxodisulfate, and also hydrogen peroxide, tert-butyl hydroperoxide, 2,2'-azobis(2-amidoisopropane) dihydrochloride, 2,2'-azobis(N,N'-dimethyleneisobutyramidine) dihydrochloride or 2,2'-azobis(4-cyano)pentanoic acid. The initiators are used either alone or in a mixture, for example mixtures of hydrogen peroxide and sodium persulfate.

The known redox initiator systems can also be used as polymerization initiators. Such redox initiator systems comprise at least one peroxide-containing compound in combination with a redox coinitiator, for example reducing sulfur compounds, for example bisulfites, sulfites, thiosulfates, dithionites or tetrathionates of alkali metals and ammonium compounds, sodium hydroxymethanesulfinate dihydrate and/or thiourea. For instance, it is possible to use combinations of peroxodisulfates with alkali metal or ammonium hydrogensulfites, for example ammonium peroxodisulfate and ammonium disulfite. The weight ratio of peroxide-containing compounds to the redox coinitiators is preferably 50:1 to 0.05:1. In combination with the initiators or the redox initiator systems, it is additionally possible to use transition metal catalysts, for example iron salts, nickel salts, cobalt salts, manganese salts, copper salts, vanadium salts or chromium salts, such as iron(II) sulfate, cobalt(II) chloride, nickel(II) sulfate, copper(I) chloride, manganese(II) acetate, vanadium(III) acetate, manganese(II) chloride. Based on the monomers, these transition metal salts are typically used in amounts of 0.1 to 1000 ppm. For instance, it is possible to use combinations of hydrogen peroxide with iron(II) salts, for example 0.5 to 30% hydrogen peroxide and 0.1 to 500 ppm of Mohr's salt.

The initiators are preferably used in an amount of 0.05 to 20% by weight, preferably 0.05 to 10%, more preferably of 0.1 to 5% by weight, based on the total weight of the olefinically unsaturated monomers used for polymerization. The terms "total amount" and "total weight" are equivalent.

The result of the use of the water-soluble initiator is that olefinically unsaturated monomers which are added to the aqueous dispersion initially charged can react immediately to give oligomers. These oligomers have a lesser tendency to penetrate into the polyurethane particles of the dispersion initially charged than the smaller monomers.

The polymerization is appropriately conducted, for example, at a temperature of greater than 0 to 160° C., preferably 60 to 95° C.

Preference is given to working under exclusion of oxygen, preferably in a nitrogen stream. In general, the polymerization is performed at standard pressure, but it is also possible to employ lower pressures or higher pressures, especially when polymerization temperatures above the boiling point of the monomers and/or of the organic solvents are employed.

The copolymers (CP) for use in accordance with the invention are prepared by free-radical aqueous emulsion polymerization, in which case surfactants or protective colloids can be added to the reaction medium. A list of suitable emulsifiers and protective colloids is given, for example, in Houben Weyl, Methoden der organischen Chemie [Methods of Organic Chemistry], volume XIV/1 Makromolekulare Stoffe [Macromolecular Substances], Georg Thieme Verlag, Stuttgart 1961, p. 411 ff.

An important factor for the preparation of the aqueous dispersions for use in accordance with the invention, comprising the copolymer (CP), is the control of the conditions of the polymerization reaction of the mixture of olefinically unsaturated monomers in the presence of the polyurethane. This is conducted in the manner of what is called a "starve feed", "starve fed" or "starved feed" polymerization.

A starved feed polymerization in the context of the present invention is considered to be an emulsion polymerization in which the content of residual monomers in the reaction solution is minimized during the reaction time, meaning that the metered addition of the olefinically unsaturated monomers is effected in such a way that a concentration of 6.0% by weight, preferably 5.0% by weight, more preferably 4.0% by weight, particularly advantageously 3.5% by weight, based in each case on the total amount of olefinically unsaturated monomers used for polymerization, in the reaction solution is not exceeded over the entire reaction time. In this context, further preference is given to concentration ranges of the olefinically unsaturated monomers of 0.01 to 6.0% by weight, preferably 0.02 to 5.0% by weight, more preferably 0.03 to 4.0% by weight, especially 0.05 to 3.5% by weight, based in each case on the total amount of olefinically unsaturated monomers used for polymerization. For example, the highest proportion (or concentration) detectable during the reaction may be 0.5% by weight, 1.0% by weight, 1.5% by weight, 2.0% by weight, 2.5% by weight or 3.0% by weight, while all further values detected are then below the values specified here. The term "concentration" in this context is thus obviously equivalent to the term "proportion".

The concentration of the monomers in the reaction solution, referred to hereinafter as free monomers, can be controlled in various ways.

One way of minimizing the concentration of the free monomers is to select a very low metering rate for the mixture of olefinically unsaturated monomers. When the rate of metered addition is so low that all monomers can react very quickly as soon as they are in the reaction solution, it is possible to ensure that the concentration of the free monomers is minimized.

As well as the metering rate, it is important that sufficient free radicals are always present in the reaction solution, so that the monomers metered in can each be reacted very rapidly. For this purpose, reaction conditions should preferably be selected such that the initiator feed is already commenced prior to commencement of the metered addition of the olefinically unsaturated monomers. Preferably, the metered addition is commenced at least 5 minutes beforehand, more preferably at least 10 minutes beforehand. Preferably at least 10% by weight of the initiator, more preferably at least 20% by weight, most preferably at least 30% by weight of the initiator, based in each case on the total amount of initiator, are added prior to commencement of the metered addition of the olefinically unsaturated monomers.

The amount of initiator is an important factor for the sufficient presence of free radicals in the reaction solution. The amount of initiator should be selected such that sufficient free radicals are available at any time, so that the monomers metered in can react. If the amount of initiator is increased, it is also possible to react greater amounts of monomers at the same time.

A further factor which can determine the reaction rate is the structure of the monomers, i.e. particularly the structural properties thereof and the reactivity which derives therefrom.

The concentration of the free monomers can thus be controlled through the interplay of the amount of initiator, rate of initiator addition, rate of monomer addition, and through the choice of monomers. Both the slowing of the metered addition and the increase in the amount of initiator, and also the early commencement of the addition of the initiator, serve the particular aim of keeping the concentration of the free monomers below the abovementioned limits.

The concentration of the monomers in the reaction solution can be determined by gas chromatography at any juncture in the reaction. Typical parameters for the gas chromatography determination are as follows: 50 m silica capillary column with polyethylene glycol phase or 50 m silica capillary column with polydimethylsiloxane phase, helium carrier gas, split injector 150° C., oven temperature 40 to 220° C., flame ionization detector, detector temperature 275° C., internal standard: isobutyl acrylate. In the context of the present invention, the concentration of the monomers is preferably determined by gas chromatography, especially while observing the abovementioned parameters.

Should this analysis determine a concentration of free monomers close to the limit for the starved feed polymerization, for example because of a high proportion of olefinically unsaturated monomers having a low reactivity, the abovementioned parameters can be utilized to control the reaction. In this case, for example, the metering rate of the monomers can be reduced and/or the amount of initiator can be increased.

Suitable olefinically unsaturated monomers may be mono- or polyolefinically unsaturated. Preferably, at least one monoolefinically unsaturated and at least one polyolefinically unsaturated monomer are present.

Examples of suitable monoolefinically unsaturated monomers include vinylic monoolefinically unsaturated monomers, such as especially (meth)acrylate-based monoolefinically unsaturated monomers and allyl compounds. Examples are also alpha,beta-unsaturated carboxylic acids. Preference is given to using at least, but not necessarily exclusively, (meth)acrylate-based monoolefinically unsaturated monomers.

The (meth)acrylate-based, monoolefinically unsaturated monomers may, for example, be (meth)acrylic acid and esters, nitriles or amides of (meth)acrylic acid.

Preference is given to esters of (meth)acrylic acid having a non-olefinically unsaturated R radical.

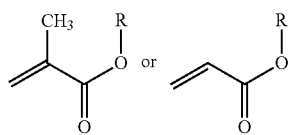

The R radical may be aliphatic or aromatic. The R radical is preferably aliphatic.

The R radical may, for example, be an alkyl radical, or contain heteroatoms. Examples of R radicals containing heteroatoms are ethers. Preference is given to using at least, but not necessarily exclusively, monomers in which the R radical is an alkyl radical.

If R is an alkyl radical, it may, for example, be a linear, branched or cyclic alkyl radical. In all three cases, it may comprise unsubstituted alkyl radicals or alkyl radicals substituted by functional groups. The alkyl radical has preferably 1 to 20, more preferably 1 to 10, carbon atoms.

Particularly preferred monounsaturated esters of (meth)acrylic acid having an unsubstituted alkyl radical are methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, amyl (meth)acrylate, hexyl (meth)acrylate, ethylhexyl (meth)acrylate, 3,3,5-trimethylhexyl (meth)acrylate, stearyl (meth)acrylate, lauryl (meth)acrylate, cycloalkyl (meth)acrylates such as cyclopentyl (meth)acrylate, isobornyl (meth)acrylate and cyclohexyl (meth)acrylate, very particular preference being given to n- and tert-butyl (meth)acrylate and methyl methacrylate.

Suitable monounsaturated esters of (meth)acrylic acid having a substituted alkyl radical may preferably be substituted by one or more hydroxyl groups.

Particularly preferred monounsaturated esters of (meth)acrylic acid having an alkyl radical substituted by one or more hydroxyl groups are 2-hydroxyethyl (meth)acrylate, 2-hydroxypropyl (meth)acrylate, 3-hydroxypropyl (meth)acrylate, 3-hydroxybutyl (meth)acrylate and 4-hydroxybutyl (meth)acrylate.

Possible further vinylic monounsaturated monomers are monomers having a non-olefinically unsaturated R' radical on the vinyl group.

The R' radical may be aliphatic or aromatic, preference being given to aromatic radicals.

The R' radical may be a hydrocarbyl radical, or contain heteroatoms. Examples of R' radicals containing heteroatoms are ethers, esters, amide, nitriles and heterocycles. Preferably, the R' radical is a hydrocarbyl radical. If R' is a hydrocarbyl radical, it may be substituted or unsubstituted by heteroatoms, preference being given to unsubstituted radicals. Preferably, the R' radical is an aromatic hydrocarbyl radical.

Particularly preferred further vinylic olefinically unsaturated monomers are vinylaromatic hydrocarbons, especially vinyltoluene, alpha-methylstyrene and especially styrene.

Further preferred monomers containing heteroatoms are olefinically unsaturated monomers such as acrylonitrile, methacrylonitrile, acrylamide, methacrylamide, N-dimethylacrylamide, vinyl acetate, vinyl propionate, vinyl chloride, N-vinylpyrrolidone, N-vinylcaprolactam, N-vinylformamide, N-vinylimidazole and N-vinyl-2-methylimidazoline.

Examples of suitable polyolefinically unsaturated monomers include esters of (meth)acrylic acid having an olefinically unsaturated R'' radical, and allyl ethers of polyhydric alcohols.

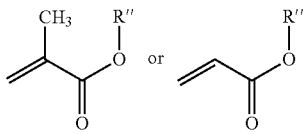

The R'' radicals may, for example, be an allyl radical or a (meth)acrylic ester radical.

Preferred polyolefinically unsaturated monomers are ethylene glycol di(meth)acrylate, propylene 1,2-glycol di(meth)acrylate, propylene 2,2-glycol di(meth)acrylate, butane-1,4-diol di(meth)acrylate, neopentyl glycol di(meth)acrylate, 3-methylpentanediol di(meth)acrylate, diethylene glycol di(meth)acrylate, triethylene glycol di(meth)acrylate, tetraethylene glycol di(meth)acrylate, dipropylene glycol di(meth)acrylate, tripropylene glycol di(meth)acrylate, hexanediol di(meth)acrylate and allyl (meth)acrylate.

Preferred polyolefinically unsaturated compounds are also acrylic and methacrylic esters of alcohols having more than two OH groups, for example trimethylolpropane tri(meth)acrylate or glyceryl tri(meth)acrylate, but also trimethylolpropane di(meth)acrylate monoallyl ether, trimethylolpropane (meth)acrylate diallyl ether, pentaerythrityl tri(meth)acrylate monoallyl ether, pentaerythrityl di(meth)acrylate diallyl ether, pentaerythrityl (meth)acrylate triallyl ether, triallylsucrose, and pentaallylsucrose.

Particular preference is given to using allyl methacrylate as the polyolefinically unsaturated monomer.

The mixture of the olefinically unsaturated monomers comprises at least one polyolefinically unsaturated monomer. Preferably, the mixture of the olefinically unsaturated monomers also comprises one or more monounsaturated esters of (meth)acrylic acid having an unsubstituted alkyl radical.

Preferably, the mixture of the olefinically unsaturated monomers contains 0.1 to 6.0 mol %, more preferably 0.1 to 2.0 mol %, most preferably 0.1 to 1.0 mol %, of polyolefinically unsaturated monomers. Preferably, the radical of the olefinically unsaturated monomers is monounsaturated.

Preferably, the mixture of the olefinically unsaturated monomers contains 0.1 to 6.0 mol %, more preferably 0.1 to 2.0 mol %, most preferably 0.1 to 2.0 mol %, of allyl methacrylate. More preferably, apart from allyl methacrylate, no further polyolefinically unsaturated monomers are present in the mixture.

Preferably, the mixture of olefinically unsaturated monomers contains less than 10.0% by weight, more preferably less than 5.0% by weight, of vinylaromatic hydrocarbons, based on the total amount of olefinically unsaturated monomers used in the polymerization. Most preferably, no vinylaromatic hydrocarbons are present in the mixture of the olefinically unsaturated monomers. It is especially preferable when less than 10.0% by weight, more preferably less than 5.0% by weight, based on the total amount of olefinically unsaturated monomers used in the polymerization, of olefinically unsaturated monomers having aromatic groups is used. More particularly, no olefinically unsaturated monomers having aromatic groups are present in the mixture of the olefinically unsaturated monomers.

It follows from this that the vinylaromatic hydrocarbons specified above as preferred, especially vinyltoluene, alpha-methylstyrene and styrene, are of course preferred only within the group of the monomers containing aromatic groups. In spite of this, these monomers are preferably not used in the context of the invention. Should the use of such monomers nevertheless be an option in the individual case, preference is given to using the monomers containing aromatic groups designated as preferred.

In a preferred embodiment, the mixture of olefinically unsaturated monomers comprises:
  98.0 to 99.5% by weight of one or more monounsaturated esters of (meth)acrylic acid having unsubstituted alkyl radicals, where the alkyl radicals preferably have 1 to 10 carbon atoms, and
  0.5 to 2.0% by weight of one or more polyunsaturated esters of (meth)acrylic acid,
based in each case on the total amount of olefinically unsaturated monomers used in the polymerization.

Preference is given to adding at least one solvent to the mixture of olefinically unsaturated monomers, said solvent preferably being miscible in any ratio with water and in any ratio with the mixture of olefinically unsaturated monomers. Suitable organic solvents are N-methylpyrrolidone, N-ethylpyrrolidone and ether alcohols, such as methoxypropanol in particular, though it should be noted that pyrrolidone-based solvents may be dispensed with for environmental reasons alone. However, the amount of the organic solvent is selected such that the aqueous character of the dispersion ultimately obtained is conserved.

By virtue of the preparation process described, the copolymers in the aqueous dispersion of the invention especially have a core-shell structure which can be achieved through the preparation process described. This core-shell structure is characterized by a core containing at least one polyurethane, and a shell containing at least one polymer which has been obtained by polymerization of olefinically unsaturated monomers.

The core-shell structure described is achieved through the specific reaction conditions of the starved feed polymerization. Over the entire reaction time, there are never any great amounts of olefinically unsaturated monomers, which could penetrate into the polyurethane particles, in the presence of the initially charged polyurethane. The free radicals provided by the water-soluble initiator, which are always present during the addition of monomer in the aqueous phase, form oligomers immediately on addition, which can no longer penetrate into the polyurethane. These then polymerize on the surface of the polyurethane.

In a preferred embodiment, the weight ratio of core to shell is 80:20 to 20:80, more preferably 60:40 to 40:60. What is meant here is the ratio of the amounts of components used for production of core (step (i), polyurethane) and shell (step (ii), mixture of olefinically unsaturated monomers).

Preferably, the copolymers (CP) in the aqueous dispersion have a particle size (z average) of 60 to 130 nm, more preferably of 70 to 115 nm, measured by means of photon correlation spectroscopy with a Malvern Nano S90 (from Malvern Instruments) at 25±1° C. The instrument, equipped with a 4 mW He—Ne laser at a wavelength of 633 nm, covers a size range from 1 to 3000 nm.

The copolymers (CP) may preferably be crosslinked. The gel content of the aqueous dispersion of the invention is preferably 40 to 97% by weight, more preferably 75 to 90% by weight, based in each case on the solids of the dispersion.

The gel content can be determined gravimetrically by freeze-drying the dispersion, determining the total mass of the freeze-dried polymer (corresponds to the solids of the dispersion in the context of determining the gel content), and then extracting the polymer in an excess of tetrahydrofuran (ratio of tetrahydrofuran to freeze-dried polymer=300:1) at 25° C. for 24 hours. The insoluble fraction is removed and dried in an air circulation oven at 50° C. for four hours. Thereafter, the dried, insoluble fraction is weighed and the quotient is formed with the total mass of the freeze-dried polymer. The value obtained corresponds to the gel content.

The weight-average molar mass of the copolymers (CP) is preferably $3*10^7$ g/mol to $8.5*10^9$ g/mol, it being possible to determine the weight-average molar mass by small-angle laser light scattering.

The acid number of the copolymers (CP) is preferably 0 to 220 mg KOH/g solid resin, preferably 0 to 40 mg KOH/g solid resin, more preferably 0 to 25 mg KOH/g solid resin. The OH number is preferably less than 70 mg KOH/g solid resin, preferably less than 20 mg KOH/g solid resin. The terms "solid resin" and "solids" in relation to a polymer or a dispersion of a polymer are equivalent. Thus, they refer more particularly to the solids or solid content of a polymer dispersion as elucidated below.

The acid number can be determined, for example, on the basis of DIN EN ISO 2114 in homogeneous solution of THF/water (9 parts by volume of THF and 1 part by volume of distilled water) with ethanolic potassium hydroxide solution.

The OH number can be determined on the basis of R.-P. Krüger, R. Gnauck and R. Algeier, Plaste and Kautschuk, 20, 274 (1982), by means of acetic anhydride in the presence of 4-dimethylaminopyridine as a catalyst in a tetrahydrofuran (THF)/dimethylformamide (DMF) solution at room temperature, by fully hydrolyzing the excess of acetic acid remaining after acetylation and conducting a potentiometric back-titration of the acetic acid with alcoholic potassium hydroxide solution.

The aqueous dispersions of the at least one copolymer (CP) preferably have a solids content of 15 to 45% by weight, especially preferably 25 to 35% by weight. Solids contents of this kind can be established without any problem through the use of appropriate amounts of organic solvents and especially water in the course of preparation of the copolymers and/or by appropriate dilution after the preparation.

The proportion of the copolymers (CP) is preferably in the range from 0.5 to 15% by weight, more preferably 0.75 to 12.5% by weight, especially preferably 1.0 to 10% by weight, especially 1.5 to 7.5% by weight, based in each case on the total weight of the coating composition of the invention.

The coating composition of the invention additionally comprises at least one specific reaction product (R), preferably exactly one reaction product (R).

The reaction products are linear. Linear reaction products can in principle be obtained by the conversion of difunctional reactants, in which case the linkage of the reactants via reaction of the functional groups gives rise to a linear, i.e. catenated, structure. Thus, for example, if the reaction product is a polymer, the backbone has a linear character. If the reaction product is, for example, a polyester, the reactants used may be diols and dicarboxylic acids, in which case the sequence of ester bonds in the reaction product has linear character. Preferably, in the preparation of the reaction product (R), principally difunctional reactants are thus used. Other reactants, such as monofunctional compounds in particular, are accordingly used preferably only in minor amounts, if at all. Especially at least 80 mol %, preferably at least 90 mol % and most preferably exclusively difunctional reactants are used. If further reactants are used, these are preferably selected exclusively from the group of the monofunctional reactants. It is preferable, however, that exclusively difunctional reactants are used.

Useful functional groups for the reactants include the functional groups known to the person skilled in the art in this context. The combinations of reactants having appropriate functional groups which can be linked to one another and can thus serve for preparation of the reaction product are also known in principle. The same applies to the reaction conditions necessary for linkage. Preferred functional groups for the reactants are hydroxyl, carboxyl, imino, carbamate, allophanate, thio, anhydride, epoxy, isocyanate, methylol, methylol ether, siloxane and/or amino groups, especially preferably hydroxyl and carboxyl groups. Preferred combinations of functional groups which can be linked to one another are hydroxyl and carboxyl groups, isocyanate and hydroxyl groups, isocyanate and amino groups, epoxy and carboxyl groups and/or epoxy and amino groups; in choosing the functional groups, it should be ensured that the hydroxyl functionality and acid number described below are obtained in the reaction product. The linkage then gives rise to the linkage points known to those skilled in the art, for example ester groups, urethane groups and/or urea groups. Very particular preference is given to a combination of hydroxyl and carboxyl groups. In this embodiment, at least one reactant thus has hydroxyl groups, and at least one further reactant carboxyl groups. Preference is given to using a combination of dihydroxy-functional and dicarboxy-functional reactants. Conducting the reaction of these reactants in a manner known per se forms reaction products containing ester bonds.

The reaction product is hydroxy-functional. It is preferable that the reactants are converted in such a way that linear molecules which form have two terminal hydroxyl groups. This means that one hydroxyl group is present at each of the two ends of these molecules.

The reaction product has an acid number of less than 20, preferably less than 15, especially preferably less than 10 and most preferably less than 5 mg KOH/g. Thus, it preferably has only a very small amount of carboxylic acid groups. Unless explicitly stated otherwise, the acid number in the context of the present invention is determined to DIN 53402. Thus, it relates to the reaction product per se, i.e. to the solids content (for determination of the solids content see below).

If reference is made in the context of the present invention to an official standard without reference to the official period of validity, this of course means the version of the standard current at the filing date or, if no current version exists at this date, the last current version.

The hydroxyl functionality described, just like the low acid number, can be obtained, for example, in a manner known per se by the use of appropriate ratios of reactants having appropriate functional groups. In the preferred case that dihydroxy-functional and dicarboxy-functional reactants are used in the preparation, an appropriate excess of the dihydroxy-functional component is thus used. In this context, the following should additionally be explained. For purely statistical reasons alone, a real reaction of course does not just give molecules having, for example, the desired (di)hydroxyl functionality. However, the choice of appropriate conditions, for example an excess of dihydroxy-functional reactants, and conducting the reaction until the desired acid number is obtained, guarantee that the conversion products or molecules which make up the reaction product are hydroxy-functional at least on average. The person skilled in the art knows how to choose appropriate conditions.

In the preparation of the reaction product, at least one compound (v) used or converted as a reactant has two functional groups (v.a) and an aliphatic or araliphatic hydrocarbyl radical (v.b) which is arranged between the two functional groups and has 12 to 70, preferably 22 to 55 and more preferably 30 to 40 carbon atoms. The compounds (v) thus consist of two functional groups and the hydrocarbyl radical. Useful functional groups of course include the above-described functional groups, especially hydroxyl and carboxyl groups. Aliphatic hydrocarbyl radicals are known to be acyclic or cyclic, saturated or unsaturated, nonaromatic hydrocarbyl radicals. Araliphatic hydrocarbyl radicals are those which contain both aliphatic and aromatic structural units.

The number-average molecular weight of the reaction products may vary widely and is, preferably, from 600 to 40 000 g/mol, especially from 800 to 10 000 g/mol, most preferably from 1200 to 5000 g/mol. Unless explicitly indicated otherwise, the number-average molecular weight in the context of the present invention is determined by means of vapor pressure osmosis. Measurement was effected using a vapor pressure osmometer (model 10.00 from Knauer) on concentration series of the component under investigation in toluene at 50° C., with benzophenone as calibration substance for determination of the experimental calibration constant of the instrument employed (in accordance with E. Schröder, G. Müller, K.-F. Arndt, "Leitfaden der Polymercharakterisierung", Akademie-Verlag, Berlin, pp. 47-54, 1982, in which benzil was used as calibration substance).

Preferred compounds (v) are dimer fatty acids, or are present in dimer fatty acids. In the preparation of the reaction products (R), dimer fatty acids are thus used preferably, but not necessarily exclusively, as compound (v). Dimer fatty acids (also long known as dimerized fatty acids or dimer acids) are generally, and especially in the context of the present invention, mixtures prepared by oligomerization of unsaturated fatty acids. They are preparable, for example, by catalytic dimerization of unsaturated plant fatty acids, the starting materials used more particularly being unsaturated $C_{12}$ to $C_{22}$ fatty acids. The bonds are formed principally by the Diels-Alder mechanism, and the result, depending on the number and position of the double bonds in the fatty acids used to prepare the dimer fatty acids, is mixtures of principally dimeric products having cycloaliphatic, linear aliphatic, branched aliphatic, and also $C_6$ aromatic hydrocarbon groups between the carboxyl groups. Depending on mechanism and/or any subsequent hydrogenation, the aliphatic radicals may be saturated or unsaturated, and the fraction of aromatic groups may also vary. The radicals between the carboxylic acid groups then contain, for example, 24 to 44 carbon atoms. For the preparation, fatty acids having 18 carbon atoms are used with preference, and so the dimeric product has 36 carbon atoms. The radicals which join the carboxyl groups of the dimer fatty acids preferably have no unsaturated bonds and no aromatic hydrocarbon radicals.

In the context of the present invention, $C_{18}$ fatty acids are thus used with preference in the preparation. Particular preference is given to the use of linolenic, linoleic and/or oleic acid.

Depending on the reaction regime, the above-identified oligomerization gives rise to mixtures comprising primarily dimeric molecules, but also trimeric molecules and monomeric molecules and other by-products. Purification is typically effected by distillation. Commercial dimer fatty acids generally contain at least 80% by weight of dimeric molecules, up to 19% by weight of trimeric molecules, and not more than 1% by weight of monomeric molecules and of other by-products.

Preference is given to using dimer fatty acids which consist to an extent of at least 90% by weight, preferably to an extent of at least 95% by weight, most preferably at least to an extent of 98% by weight, of dimeric fatty acid molecules.

In the context of the present invention, preference is given to using dimer fatty acids which consist of at least 90% by weight of dimeric molecules, less than 5% by weight of trimeric molecules, and less than 5% by weight of monomeric molecules and other by-products. Particular preference is given to the use of dimer fatty acids which consist of 95 to 98% by weight of dimeric molecules, less than 5% by weight of trimeric molecules, and less than 1% by weight of monomeric molecules and of other by-products. Likewise used with particular preference are dimer fatty acids consisting of at least 98% by weight of dimeric molecules, less than 1.5% by weight of trimeric molecules, and less than 0.5% by weight of monomeric molecules and other by-products. The fractions of monomeric, dimeric, and trimeric molecules and of other by-products in the dimer fatty acids can be determined, for example, by means of gas chromatography (GC). In that case, prior to the GC analysis, the dimer fatty acids are converted to the corresponding methyl esters via the boron trifluoride method (cf. DIN EN ISO 5509) and then analyzed by means of GC.

A fundamental identifier of "dimer fatty acids" in the context of the present invention, therefore, is that their preparation involves the oligomerization of unsaturated fatty acids. This oligomerization gives rise principally, in other words to an extent preferably of at least 80% by weight, more preferably to an extent of at least 90% by weight, even more preferably to an extent of at least 95% by weight and more particularly to an extent of at least 98% by weight, to dimeric products. The fact that the oligomerization thus gives rise to predominantly dimeric products containing exactly two fatty acid molecules justifies this designation, which is commonplace in any case. An alternative expression for the relevant term "dimer fatty acids", therefore, is "mixture comprising dimerized fatty acids". The use of dimeric fatty acids thus automatically implements the use of difunctional compounds (v). This also justifies the statement, chosen in the context of the present invention, that dimer fatty acids are preferably used as compound (v). This is because compounds (v) are apparently the main constituent of the mixtures referred to as dimer fatty acids. Thus, if dimer fatty acids are used as compounds (v), this means that these compounds (v) are used in the form of corresponding mixtures with above-described monomeric and/or trimeric molecules and/or other by-products.

The dimer fatty acids to be used can be obtained as commercial products. Examples include Radiacid 0970, Radiacid 0971, Radiacid 0972, Radiacid 0975, Radiacid 0976, and Radiacid 0977 from Oleon, Pripol 1006, Pripol 1009, Pripol 1012, and Pripol 1013 from Croda, Empol 1008, Empol 1061, and Empol 1062 from BASF, and Unidyme 10 and Unidyme TI from Arizona Chemical.

Further preferred compounds (v) are dimer diols, or are present in dimer diols. Dimer diols have long been known and are also referred to in the scientific literature as dimeric fatty alcohols. These are mixtures which are prepared, for example, by oligomerization of unsaturated fatty acids or esters thereof and subsequent hydrogenation of the acid or ester groups, or by oligomerization of unsaturated fatty alcohols. The starting materials used may be unsaturated $C_{12}$ to $C_{22}$ fatty acids or esters thereof, or unsaturated $C_{12}$ to $C_{22}$ fatty alcohols. The hydrocarbyl radicals which connect the hydroxyl groups in the dimer diols are defined in the same way as the hydrocarbyl radicals which divide the carboxyl groups of the dimer fatty acids.

For example, DE-11 98 348 describes the preparation thereof by dimerization of unsaturated fatty alcohols with basic alkaline earth metal compounds at more than 280° C.

They can also be prepared by hydrogenation of dimer fatty acids and/or esters thereof as described above, according to German Auslegeschrift DE-B-17 68 313. Under the conditions described therein, not only are the carboxyl groups of the fatty acids hydrogenated to hydroxyl groups, but any double bonds still present in the dimer fatty acids or esters thereof are also partly or fully hydrogenated. It is also possible to conduct the hydrogenation in such a way that the double bonds are fully conserved during the hydrogenation. In this case, unsaturated dimer diols are obtained. Preferably, the hydrogenation is conducted in such a way that the double bonds are very substantially hydrogenated.

Another way of preparing dimer diols involves dimerizing unsaturated alcohols in the presence of siliceous earth/alumina catalysts and basic alkali metal compounds according to international application WO 91/13918.

Irrespective of the processes described for preparation of the dimer diols, preference is given to using those dimer diols which have been prepared from $C_{18}$ fatty acids or esters thereof, or $C_{18}$ fatty alcohols. In this way, predominantly dimer diols having 36 carbon atoms are formed.

Dimer diols which have been prepared by the abovementioned industrial processes always have varying amounts of trimer triols and monofunctional alcohols. In general, the proportion of dimeric molecules is more than 70% by weight, and the remainder is trimeric molecules and monomeric molecules. In the context of the invention, it is possible to use either these dimer diols or purer dimer diols having more than 90% by weight of dimeric molecules. Particular preference is given to dimer diols having more than 90 to 99% by weight of dimeric molecules, and preference is given in turn among these to those dimer diols whose double bonds and/or aromatic radicals have been at least partly or fully hydrogenated. An alternative expression for the relevant term "dimer diols" is thus "mixture comprising dimers preparable by dimerization of fatty alcohols". The use of dimer diols thus automatically implements the use of the functional compounds (v). This also justifies the statement, chosen in the context of the present invention, that dimer diols are used as compound (v). This is because compounds (v) are apparently the main constituent of the mixtures referred to as dimer diols. Thus, if dimer diols are used as compounds (v), this means that these compounds (v) are used in the form of corresponding mixtures with above-described monomeric and/or trimeric molecules and/or other by-products.

Preferably, the mean hydroxyl functionality of the dimer diols should be 1.8 to 2.2.

In the context of the present invention, particular preference is therefore given to using those dimer diols which can be prepared by hydrogenation from the above-described dimer fatty acids. Very particular preference is given to those dimer diols which consist of ≥90% by weight of dimeric molecules, ≤5% by weight of trimeric molecules, and ≤5% by weight of monomeric molecules and of other by-products, and/or have a hydroxyl functionality of 1.8 to 2.2. Particular preference is given to the use of those diols which can be prepared by hydrogenation from dimer fatty acids which consist of 95 to 98% by weight of dimeric molecules, less than 5% by weight of trimeric molecules, and less than 1% by weight of monomeric molecules and of other by-products. Particular preference is likewise given to the use of those diols which can be prepared by hydrogenation from dimer fatty acids which consist of ≥98% by weight of dimeric molecules, ≤1.5% by weight of trimeric molecules, and ≤0.5% by weight of monomeric molecules and of other by-products.

Dimer fatty acids which can be used to prepare the dimer diols contain, as already described above, according to the reaction regime, both aliphatic and possibly aromatic molecular fragments. The aliphatic molecular fragments can be divided further into linear and cyclic fragments, which in turn may be saturated or unsaturated. Through hydrogenation, the aromatic and the unsaturated aliphatic molecular fragments can be converted to corresponding saturated aliphatic molecular fragments. The dimer diols usable as component (v) may accordingly be saturated or unsaturated. The dimer diols are preferably aliphatic, especially aliphatic and saturated.

In the context of the present invention, preference is given to using those dimer diols which can be prepared by hydrogenation of the carboxylic acid groups of preferably saturated aliphatic dimer fatty acids.

Particular preference is given to the use of those diols which can be prepared by hydrogenation from dimer fatty acids which consist of ≥98% by weight of dimeric molecules, ≤1.5% by weight of trimeric molecules, and ≤0.5% by weight of monomeric molecules and of other by-products.

More preferably, the dimer diols have a hydroxyl number of 170 to 215 mg KOH/g, even more preferably of 195 to 212 mg KOH/g and especially 200 to 210 mg KOH/g, determined by means of DIN ISO 4629. More preferably, the dimer diols have a viscosity of 1500 to 5000 mPas, even more preferably 1800 to 2800 mPas (25° C., Brookfield, ISO 2555).

Dimer diols for use with very particular preference include the commercial products Pripol® 2030 and especially Priopol® 2033 from Uniqema, or Sovermol® 908 from BASF.

Preferred reaction products (R) are preparable by reaction of dimer fatty acids with aliphatic, araliphatic or aromatic dihydroxy-functional compounds. Aliphatic compounds are nonaromatic organic compounds. They may be linear, cyclic or branched. Possible examples of compounds are those which consist of two hydroxyl groups and an aliphatic hydrocarbyl radical. Also possible are compounds which, as well as the two oxygen atoms present in the two hydroxyl groups, contain further heteroatoms such as oxygen or nitrogen, especially oxygen, for example in the form of linking ether and/or ester bonds. Araliphatic compounds are those which contain both aliphatic and aromatic structural units. It is preferable, however, that the reaction products (R) are prepared by reaction of dimer fatty acids with aliphatic dihydroxy-functional compounds.

The aliphatic, araliphatic or aromatic dihydroxy-functional compounds preferably have a number-average molecular weight of 120 to 6000 g/mol, especially preferably of 200 to 4500 g/mol.

The statement of a number-average molecular weight thus implies that preferred dihydroxy-functional compounds are mixtures of various large dihydroxy-functional molecules. The dihydroxy-functional compounds are preferably polyether diols, polyester diols or dimer diols.

It is preferable in the context of the present invention that the dimer fatty acids and the aliphatic, araliphatic and/or aromatic, preferably aliphatic, dihydroxy-functional compounds are reacted with one another in a molar ratio of 0.7/2.3 to 1.6/1.7, preferably of 0.8/2.2 to 1.6/1.8 and most preferably of 0.9/2.1 to 1.5/1.8. As a result of the excess of hydroxyl groups, hydroxy-functional reaction products additionally having a low acid number are thus obtained. Through the level of the excess, it is possible to control the molecular weight of the reaction product. If only a small excess of the hydroxy-functional reactant is used, the result is correspondingly longer-chain products, since only in that case is a substantial conversion of the acid groups present guaranteed. In the case of a higher excess of the hydroxy-functional reactant, the result is correspondingly shorter-chain reaction products. The number-average molecular weight of the reaction products is of course also influenced by the molecular weight of the reactants, for example the preferably aliphatic dihydroxy-functional compounds. The number-average molecular weight of the preferred reaction products may vary widely and is, for example, from 600 to 40 000 g/mol, especially from 800 to 10 000 g/mol, most preferably from 1200 to 5000 g/mol.

The preferred reaction products can thus also be described as linear block-type compounds $A\text{-}(B\text{-}A)_n$. In that case, at least one type of blocks is based on a compound (v). Preferably, the B blocks are based on dimer fatty acids, i.e. compounds (v). The A blocks are preferably based on aliphatic dihydroxy-functional compounds, especially preferably on aliphatic polyether diols, polyester diols or dimer diols. In the latter case, the respective reaction product is thus based exclusively on compounds (v) joined to one another.

Very particularly preferred reaction products (R) are preparable by reaction of dimer fatty acids with at least one aliphatic dihydroxy-functional compound of the general structural formula (I):

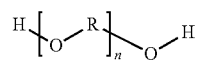

where R is a $C_3$ to $C_6$ alkylene radical and n is correspondingly selected such that the compound of the formula (I) has a number-average molecular weight of 120 to 6000 g/mol, the dimer fatty acids and the compounds of the formula (I) are used in a molar ratio of 0.7/2.3 to 1.6/1.7, and the resulting reaction product has a number-average molecular weight of 600 to 40 000 g/mol and an acid number of less than 10 mg KOH/g, In a very particularly preferred embodiment, n is thus selected here such that the compound of the formula (I) has a number-average molecular weight of 450 to 2200 g/mol, especially 800 to 1200 g/mol. R is preferably a $C_3$ or $C_4$ alkylene radical. It is more preferably an isopropylene radical or a tetramethylene radical. Most preferably, the compound of the formula (I) is polypropylene glycol or polytetrahydrofuran. The dimer fatty acids and the compounds of the formula (I) are used here preferably in a molar ratio of 0.7/2.3 to 1.3/1.7. In this embodiment, the resulting reaction product has a number-average molecular weight of 1500 to 5000 g/mol, preferably 2000 to 4500 g/mol and most preferably 2500 to 4000 g/mol.

Likewise very particularly preferred reaction products (R) are preparable by reaction of dimer fatty acids with at least one dihydroxy-functional compound of the general structural formula (II):

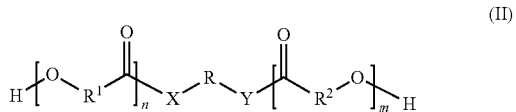

where

R is a divalent organic radical comprising 2 to 10 carbon atoms, $R^1$ and $R^2$ are each independently straight-chain or branched alkylene radicals having 2 to 10 carbon atoms, X and Y are each independently O, S or $NR^3$ in which $R^3$ is hydrogen or an alkyl radical having 1 to 6 carbon atoms, and m and n are correspondingly selected such that the compound of formula (II) has a number-average molecular weight of 450 to 2200 g/mol, in which components (a) and (b) are used in a molar ratio of 0.7/2.3 to 1.6/1.7 and the resulting reaction product has a number-average molecular weight of 1200 to 5000 g/mol and an acid number of less than 10 mg KOH/g.

In structural formula (II), R is a divalent organic radical comprising 2 to 10 carbon atoms and preferably 2 to 6 carbon atoms. The R radical may, for example, be aliphatic, aromatic or araliphatic. The R radical, as well as carbon atoms and hydrogen atoms, may also contain heteroatoms, for example O or N. The radical may be saturated or unsaturated. R is preferably an aliphatic radical having 2 to 10 carbon atoms, more preferably an aliphatic radical having 2 to 6 carbon atoms and most preferably an aliphatic radical having 2 to 4 carbon atoms. For example, the R radical is $C_2H_4$, $C_3H_6$, $C_4H_8$ or $C_2H_4$—O—$C_2H_4$.

$R^1$ and $R^2$ are each independently straight-chain or branched alkylene radicals having 2 to 10 carbon atoms, preferably 2 to 6 carbon atoms and more preferably 3 to 5 carbon atoms. These radicals preferably contain only carbon and hydrogen.

In the compounds of the structural formula (II), all n $R^1$ radicals and all m $R^2$ radicals may be identical. However, it is also possible that different kinds of $R^1$ and $R^2$ radicals are present. Preferably, all $R^1$ and $R^2$ radicals are identical.

With very particular preference, $R^1$ and $R^2$ are a $C_4$ or $C_5$ alkylene radical, especially a tetramethylene or pentamethylene radical. In a very particularly preferred embodiment of the present invention, both radicals, $R^1$ and $R^2$, are pentamethylene radicals.

X and Y are each independently O, S or $NR^3$ in which $R^3$ is hydrogen or an alkyl radical having 1 to 6 carbon atoms. Preferably, X and Y are each independently O or $NR^3$; more preferably, they are each independently O and NH; most preferably, X and Y are O.

The indices m and n are accordingly selected such that the compounds of the structural formula (II) have a number-average molecular weight of 450 to 2200 g/mol, preferably 500 to 1400 g/mol, more preferably 500 to 1200 g/mol.

The polyester polyols of the general structural formula (I) can be prepared by a first route, where compounds HX—R—YH act as starter compounds and the hydroxy-terminated polyester chains are polymerized onto the starter compound by ring-opening polymerization of lactones of the hydroxycarboxylic acids HO—$R^1$—COOH and HO—$R^2$—COOH. By a second route, it is of course also possible first to prepare alpha-hydroxy-gamma-carboxy-terminated polyesters, for example by ring-opening polymerization of lactones of the hydroxycarboxylic acids HO—$R^1$—COOH and HO—$R^2$—COOH, or by polycondensation of the hydroxycarboxylic acids HO—$R^1$—COOH and HO—$R^2$—COOH. The alpha-hydroxy-gamma-carboxy-terminated polyesters can then be reacted in turn with compounds HX—R—YH, by means of a condensation reaction, to give the polyester diols for use in accordance with the invention.

Corresponding processes are described, for example, in German Offenlegungsschrift 2234265 "Hydroxylendständige Polylactone" [Hydroxyl-terminal polylactones] from the applicant Stamicarbon N.V.

The dimer fatty acids and the compounds of the formula (II) are used here preferably in a molar ratio of 0.7/2.3 to 1.3/1.7. In this embodiment, the resulting reaction product has a number-average molecular weight of 1200 to 5000 g/mol, preferably 1200 to 4500 g/mol and most preferably 1200 to 4000 g/mol.

Likewise very particularly preferred reaction products (R) are preparable by reaction of dimer fatty acids with dimer diols, in which the dimer fatty acids and dimer diols are used in a molar ratio of 0.7/2.3 to 1.6/1.7 and the resulting reaction product has a number-average molecular weight of 1200 to 5000 g/mol and an acid number of less than 10 mg KOH/g.

Preferred dimer diols have already been described above. It is preferable here that the dimer fatty acids and dimer diols are used in a molar ratio of 0.7/2.3 to 1.3/1.7. The resulting reaction product here preferably has a number-average molecular weight of 1200 to 5000 g/mol, preferably 1300 to 4500 g/mol, and very preferably 1500 to 4000 g/mol.

It follows from the above statements that the reaction products (R) are preparable by the exclusive use of compounds (v). For example, it is possible to prepare the reaction products by the use of the above-described preferred dimer fatty acids and dimer diols. Both compound classes are compounds (v), or both compound classes are mixtures comprising difunctional compounds (v). However, it is equally possible to prepare reaction products (R) by the reaction of compounds (v), preferably dimer fatty acids, with other organic compounds, especially those of the structural formulae (I) and (II).

In the context of the present invention, it is preferable that 25 to 100 mol % of at least one compound (v) are used in the preparation of the reaction products. If exclusively compounds (v) are used, it is evident that at least two compounds (v) are used.

The proportion of the reaction products (R) is preferably in the range from 0.1 to 15% by weight, preferably 0.5 to 12% by weight, more preferably 0.75 to 8% by weight, based in each case on the total weight of the aqueous coating composition of the invention.

If the content of the reaction products (R) is below 0.1% by weight, it may be the case that no further improvement is achieved in the stability to pinholes. If the content is more than 15% by weight, disadvantages may occur under some circumstances, for example incompatibility of said reaction product in the aqueous coating composition. Such incompatibility may be manifested, for example, in uneven leveling and also in floating or settling.

The reaction product for use in accordance with the invention is generally sparingly soluble in aqueous systems. It is therefore preferably used directly in the production of the aqueous coating composition, and is not added to the otherwise finished coating composition only on completion of production.

The coating composition of the invention comprises at least one specific polyurethane resin (X), preferably exactly one such polyurethane resin.

Polyurethane resins are known in principle; the preparation thereof and the starting compounds usable in the preparation, especially polyisocyanates and polyols, which are also used for preparation of the polyurethane resin (X), are described, for example, in WO 92/15405 A1, page 4 line 28 to page 10 line 32 and page 14 line 13 to page 15 line 28, or else in DE 199 48 004 A1, page 4 line 19 to page 9 line 62 and/or else further up in the description of the polyurethane used in step (i) of the preparation of the copolymer (CP).

It is preferable that the at least one polyurethane resin (X) is carboxy-functional. It preferably has an acid number of 5 to 100 mg KOH/g, more preferably 7 to 50 mg KOH/g, especially preferably 15 to 35 mg KOH/g. Especially the carboxylic acid groups present can hydrophilically stabilize the polyurethane resin (X), or the polyurethane resin (X) has elevated dispersibility in aqueous media, such that it can be transferred into aqueous dispersions as described below without adverse effects and hence can also be integrated into the aqueous coating composition of the invention. As is well known, such carboxylic acid groups, according to the pH or according to use of neutralizing agents which are known in this context, may also be present as ionic carboxylate groups. Carboxylic acid groups are thus among the functional groups which can be converted to ionic groups (potentially ionic groups). Neutralization of the carboxyl groups is accomplished using, for example, ammonia, amines and/or amino alcohols, such as di- and triethylamine, dimethylaminoethanol, diisopropanolamine, morpholines and/or N-alkylmorpholines.

The carboxylic acid groups are used in the preparation of the polyurethane resin (X) through the use of corresponding starting compounds for the preparation of these polyurethane resins, namely through carboxyl-containing compounds (x.1) containing at least one carboxylic acid group and at least one functional group reactive toward isocyanate groups, preferably hydroxyl groups. In this way, it is possible to incorporate the compound (x.1) into the polyurethane base skeleton and, at the same time, to introduce carboxylic acid groups into the polyurethane resin (X). Preferably, the compound (x.1) contains at least one carboxylic acid group and at least two hydroxyl groups, most preferably one carboxylic acid group and two hydroxyl groups.

Useful compounds (x.1) include, if they contain carboxyl groups, for example, polyether polyols and/or polyester polyols, especially polyester polyols. Polyester polyols of this kind are described, for example, in DE 39 03 804 A1 and can be prepared in the manner known to those skilled in the art. For example, said polyester polyols (x.1) can be prepared via a standard polyester synthesis in organic solvents and in the presence of standard catalysts such as dibutyltin laurate, it being possible to use not only difunctional monomeric starting compounds typically used, i.e. diols and dicarboxylic acids and corresponding anhydrides, but also trifunctional starting compounds such as triols, tricarboxylic acids and corresponding anhydrides, for example trimellitic anhydride, and dihydroxycarboxylic acids. In this way, it is possible through the introduction of possible branching sites to prepare polyesters which may contain both hydroxyl groups and carboxylic acid groups. Since a polyester, being a polymeric system, is always a mixture of molecules of different size, it is apparent that the features specified above, for example with regard to the existence of carboxylic acid groups or hydroxyl groups in polyesters (x.1), are regarded as statistical mean values. Preferably, such compounds (x.1) have number-average molecular weights 300 to 3000 g/mol. The preparation of such compounds (x.1) is possible through simple adjustment of, for example, reaction conditions and ratios used for the starting materials described.

However, compounds (x.1) used are preferably low molecular weight compounds having at least one carboxylic acid group and at least one functional group reactive toward isocyanate groups, preferably hydroxyl groups. In the context of the present invention, the expression "low molecular weight compound", as opposed to higher molecular weight compounds, especially polymers, should be understood to mean those to which a discrete molecular weight can be assigned, as preferably monomeric compounds. A low molecular weight compound is thus, more particularly, not a polymer, since the latter are always a mixture of molecules and have to be described using mean molecular weights. Preferably, the term "low molecular weight compound" is understood to mean that corresponding compounds have a molecular weight of less than 300 g/mol. Preference is given to the range from 100 to 200 g/mol.

Compounds (x.1) preferred in this context are, for example, monocarboxylic acids containing two hydroxyl groups, for example dihydroxypropionic acid, dihydroxysuccinic acid and dihydroxybenzoic acid. Very particularly preferred compounds (x.1) are alpha,alpha-dimethylolalkanoic acids such as 2,2-dimethylolacetic acid, 2,2-dimethylolpropionic acid, 2,2-dimethylolbutyric acid and 2,2-dimethylolpentanoic acid, especially 2,2-dimethylolpropionic acid.

The polyurethane resins (X) can be prepared by known and established methods in bulk or solution, especially preferably by conversion of the starting compounds used in typical organic solvents, such as methyl ethyl ketone, at elevated temperatures and optionally with use of catalysts typical for polyurethane preparation. Such catalysts are known to those skilled in the art, one example being dibutyltin laurate.

It is preferable, however, that the preparation is effected at temperatures of not higher than 120° C., preferably of 30 to 100° C., especially of 40 to 90° C. This has the advantage that the carboxylic acid groups present in the compounds (x.1) react only to a minor degree, if at all, with any polyols present to form ester bonds, such that the carboxylic acid groups remain in their free form and hence can form the basis of the carboxyl functionality of the polyurethane resin (X). However, the temperatures mentioned are in any case sufficient to permit an effective reaction of isocyanates with alcohols and amines. It is likewise preferable in this context when no catalysts usable for polyurethane preparation, for example dibutyltin laurate, are used. This is because catalysts usable for polyurethane preparation are known to generally catalyze ester formation too. Preferably, the polyurethane resin, after the preparation, which preferably proceeds in organic solvents, is transferred to an aqueous dispersion. This is preferably done by adding neutralizing agents already mentioned above and adding water, and distilling off the at least one organic solvent. The addition of water is conducted in such a way that the dispersions of the polyurethane resin (X) have a solids content (nonvolatile content) of preferably 10 to 60% by weight, especially 15 to 45% by weight. The polyurethane resin (X) is preferably used in the coating composition of the invention in the form of such dispersions.

Preferably, the preparation of the polyurethane resins (X) proceeds in such a way that difunctional starting compounds, preferably diols and diisocyanates, and a component (x.1) are first reacted with one another to give a prepolymer still containing isocyanate groups, and the latter is then reacted with a starting compound having at least three hydroxyl groups, preferably exactly three hydroxyl groups. Preference is given to monomeric triols, especially trimethylolethane, trimethylolpropane and glycerol. This is then followed, as described, by neutralization with preferably tertiary amines and dispersion of the polyurethane resin (X) in water.

Preferably, in the first step, at least one polyester diol, at least one monomeric diol, at least one monomeric compound (x.1) as described above and at least one polyisocyanate are reacted and then, in the second step, the product is reacted with at least one monomeric triol as described above.

In the context of the present invention, it is preferable that at least 70% by weight of the starting compounds used for preparation of the polyurethane resin (X) are those which contain, as functional polymerizable groups (i.e. those suitable for formation of polymeric base skeletons), exclusively isocyanate groups, hydroxyl groups and carboxylic acid groups, and also anhydride groups derived therefrom. In this way, and through the suitable selection of the reaction conditions known per se for preparation of polyurethane resins, it is possible to prepare resins in which the starting compounds are linked principally via urethane bonds (through reaction of isocyanate groups and hydroxyl groups) and the carboxylic acid groups remain in unconverted form in the polymer for achievement of the acid number which is essential to the invention. The polyurethane resin (B) is thus a resin in which, through the appropriate selection of starting compounds, the linkage of these starting compounds has been achieved principally through urethane bonds. Further functional polymerizable groups are known to those skilled in the art. Ultimately, useful groups in this context are all the possible groups for preparation of polycondensation and polyaddition resins, and also olefinically unsaturated groups as encountered in vinyl-containing, allyl-containing and acryloyl- and methacryloyl-containing starting compounds for preparation of resins preparable by free-radical polymerization, such as (meth)acrylate (co)polymers. Examples include thio, N-methylolamino-N-alkoxymethylamino, imino, carbamate, allophanate, epoxy, methylol, methylol ether, siloxane, carbonate, amino, and beta-hydroxyalkylamide groups, and also vinyl, allyl, acryloyl and methacryloyl groups. It is preferable that at least 80% by weight, preferably at least 90% by weight and most preferably 100% by weight of the starting compounds used for preparation of the polyurethane resins (X) contain exclusively isocyanate groups, hydroxyl groups and carboxylic acid groups as polymerizable groups. It is thus especially preferable that the polyurethane resin (X) is not a copolymer.

The number-average molecular weight of the polyurethane resins (X) may vary widely. It is preferably in the range from 1000 to 50 000 g/mol, especially 2000 to 30 000 g/mol.

The proportion of the polyurethane resins (X) is preferably in the range from 0.1 to 15% by weight, preferably 0.5 to 10% by weight, more preferably 0.75 to 8% by weight, based in each case on the total weight of the aqueous coating composition of the invention.

The coating compositions of the invention preferably comprise pigments, i.e. color pigments and/or effect pigments. Such color pigments and effect pigments are known to those skilled in the art and are described, for example, in Römpp-Lexikon Lacke and Druckfarben, Georg Thieme Verlag, Stuttgart, New York, 1998, pages 176 and 451. The terms "coloring pigment" and "color pigment" are interchangeable, just like the terms "visual effect pigment" and "effect pigment".

Preferred effect pigments are, for example, platelet-shaped metal effect pigments such as lamellar aluminum pigments, gold bronzes, oxidized bronzes and/or iron oxide-aluminum pigments, pearlescent pigments such as pearl essence, basic lead carbonate, bismuth oxide chloride and/or metal oxide-mica pigments and/or other effect pigments such as lamellar graphite, lamellar iron oxide, multilayer effect pigments composed of PVD films and/or liquid crystal polymer pigments. Particular preference is given to platelet-shaped metal effect pigments, especially lamellar aluminum pigments.

Typical color pigments especially include inorganic coloring pigments such as white pigments such as titanium dioxide, zinc white, zinc sulfide or lithopone; black pigments such as carbon black, iron manganese black, or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

The proportion of the pigments may, for example, be within the range from 1 to 30% by weight, preferably 1.5 to 20% by weight, more preferably 2.0 to 15% by weight, based on the total weight of the coating composition of the invention.

The coating compositions of the invention comprise, through the use of components (CP), (R) and (X), curable binders, especially physically and thermally curable binders. A "binder" in the context of the present invention and in accordance with relevant DIN EN ISO 4618 is the nonvolatile component of a coating composition, without pigments and fillers. Specific binders are accordingly, for example, also standard coatings additives, the copolymer (CP), the reaction product (R), the polyurethane resin (X) or further polymers usable as described below, and typical crosslinking agents as described below. However, the expression is used hereinafter, merely for the sake of better clarity, principally in relation to particular physically and thermally curable polymers, for example particular polyurethanes, polyesters, polyacrylates and/or copolymers of the polymers mentioned.

In the context of the present invention, the term "physical curing" means the formation of a film through loss of solvent from polymer solutions or polymer dispersions. Typically, no crosslinking agents are necessary for this curing.

In the context of the present invention, the term "thermal curing" means the heat-initiated crosslinking of a coating film, with either a separate crosslinking agent or else self-crosslinking binders being employed in the parent coating material. The crosslinking agent contains reactive functional groups which are complementary to the reactive functional groups present in the binders. This is commonly referred to by those in the art as external crosslinking. Where the complementary reactive functional groups or autoreactive functional groups—i.e. groups which react with groups of the same kind—are already present in the binder molecules, the binders present are self-crosslinking. Examples of suitable complementary reactive functional groups and autoreactive functional groups are known from German patent application DE 199 30 665 A1, page 7 line 28 to page 9 line 24.

The coating composition of the invention preferably also comprises at least one polymer other than the copolymers (EP), the reaction products (R) and the polyurethane resins (X) as a binder, especially at least one polymer selected from the group consisting of polyurethanes, polyesters, polyacrylates and/or copolymers of the polymers mentioned, especially polyurethane polyacrylates. Preferred polyurethane-polyacrylate copolymers (acrylated polyurethanes) other than the copolymers (CP) and the preparation thereof are described, for example, in WO 91/15528 A1, page 3 line 21 to page 20 line 33, and in DE 4437535 A1, page 2 line 27 to page 6 line 22. The polymers described as binders are preferably hydroxy-functional. Preferably, the coating compositions of the invention comprise, as well as the at least one copolymer (EP), the at least one reaction product (R) and the at least one polyurethane resin (X), at least one polyurethane-polyacrylate copolymer other than the copolymers (CP).

The proportion of the further polymers as a binder, preferably the at least one polyurethane-polyacrylate copolymer other than the copolymers (CP), is preferably in the range from 0.5 to 20.0% by weight, more preferably 1.0 to 15.0% by weight, especially preferably 1.5 to 10.0% by weight, based in each case on the total weight of the coating composition of the invention.

In addition, the coating composition of the invention preferably comprises at least one typical crosslinking agent known per se. It preferably comprises, as a crosslinking agent, at least one am inoplast resin and/or a blocked polyisocyanate, preferably an aminoplast resin. Among the aminoplast resins, melamine resins in particular are preferred.

The proportion of the crosslinking agents, especially aminoplast resins and/or blocked polyisocyanates, more preferably aminoplast resins, among these preferably melamine resins, is preferably in the range from 0.5 to 20.0% by weight, more preferably 1.0 to 15.0% by weight, especially preferably 1.5 to 10.0% by weight, based in each case on the total weight of the coating composition of the invention.

It follows from the above that the coating composition of the invention is preferably thermally curable and externally crosslinking. This is because it is possible to achieve appropriate external crosslinking through the use of hydroxy-functional reaction products (R), preferably hydroxy-functional polyurethane-polyacrylate copolymers other than the copolymers (CP), and also crosslinking agents, especially melamine resins. The statement that a coating composition is self-crosslinking and/or externally crosslinking in the context of the present invention should be understood to mean that this coating composition comprises polymers as binders and optionally crosslinking agents, which can correspondingly crosslink with one another. The underlying mechanisms and usable binders and crosslinking agents have been described above.

Preferably, the coating composition of the invention additionally comprises at least one thickener. Suitable thickeners are inorganic thickeners from the group of the sheet silicates. Lithium-aluminum-magnesium silicates are particularly suitable. As well as the inorganic thickeners, however, it is also possible to use one or more organic thickeners. These are preferably selected from the group consisting of (meth) acrylic acid-(meth)acrylate copolymer thickeners, for example the commercial product Rheovis AS S130 (BASF), and of polyurethane thickeners, for example the commercial product Rheovis PU 1250 (BASF). The thickeners used are different than the above-described polymers, for example the preferred binders. Preference is given to inorganic thickeners from the group of the sheet silicates.

The proportion of the thickeners is preferably in the range from 0.01 to 5.0% by weight, preferably 0.02 to 4% by weight, more preferably 0.05 to 3.0% by weight, based in each case on the total weight of the coating composition of the invention.

In addition, the coating composition of the invention may also comprise at least one additive. Examples of such additives are salts which can be broken down thermally without residue or substantially without residue, resins as binders that are curable physically, thermally and/or with actinic radiation and are different than the polymers already mentioned, further crosslinking agents, organic solvents, reactive diluents, transparent pigments, fillers, dyes soluble in a molecular dispersion, nanoparticles, light stabilizers, antioxidants, deaerating agents, emulsifiers, slip additives, polymerization inhibitors, initiators of free-radical polymerizations, adhesion promoters, flow control agents, film-forming assistants, sag control agents (SCAs), flame retardants, corrosion inhibitors, waxes, siccatives, biocides, and matting agents.

Suitable additives of the aforementioned kind are known, for example, from
　　German patent application DE 199 48 004 A1, page 14 line 4 to page 17 line 5,
　　German patent DE 100 43 405 C1 column 5, paragraphs [0031] to [0033].

They are used in the customary and known amounts. For example, the proportion thereof may be in the range from 1.0 to 20.0% by weight, based on the total weight of the aqueous coating composition.

The solids content of the coating compositions of the invention may vary according to the requirements of the individual case. The solids content is guided primarily by the viscosity required for application, more particularly for spray application, and so may be adjusted by the skilled person on the basis of his or her general art knowledge, optionally with assistance from a few exploratory tests.

The solids content of the coating composition of the invention is preferably 5 to 70% by weight, more preferably 8 to 60% by weight, most preferably 12 to 55% by weight.

"Solids content" (nonvolatile content) is understood to mean that proportion by weight which remains as a residue on evaporation under fixed conditions. In the present application, the solids content is determined to DIN EN ISO 3251. This is done by evaporating the basecoat material at 130° C. for 60 minutes.

Unless stated otherwise, this test method is likewise employed in order, for example, to find out or predetermine the proportion of various components of the coating composition, for example of a copolymer (CP) or of a crosslinking agent, in the total weight of the coating composition. Thus, the solids content of a dispersion of a copolymer (CP) or of a crosslinking agent which is to be added to the coating composition is determined. By taking into account the solids content of the dispersion and the amount of the dispersion used in the coating composition, it is then possible to ascertain or find out the proportion of the component in the overall composition. The coating composition of the invention is aqueous. The expression "aqueous" is known in this context to the skilled person. What is meant is basically a coating composition not based exclusively on organic solvents, i.e. not containing exclusively organic-based solvents, but instead containing, on the contrary, a significant proportion of water as solvent. "Aqueous" in the context of the present invention should preferably be understood to mean that the coating material in question has a proportion of at least 40% by weight, preferably at least 50% by weight, even more preferably at least 60% by weight, especially at least 70% by weight, of water, based in each case on the total amount of the solvents present (i.e. water and organic solvents). Preferably in turn, the proportion of water is 40 to 95% by weight, especially 50 to 92.5% by weight, even more preferably 60 to 90% by weight, more preferably 70 to 87.5% by weight, based in each case on the total amount of the solvents present.

The same definition of "aqueous" of course also applies to all further systems described in the context of the present invention, for example to the aqueous character of the aqueous dispersions of the copolymers (CP).

The coating compositions of the invention can be produced using the mixing assemblies and mixing techniques that are customary and known for the production of basecoat materials.

Preferably, the coating composition of the invention is a basecoat material, or the coating composition is preferably used as a basecoat material. This is especially true in the context of the process according the invention described hereinafter.

A basecoat material is an intermediate coating material that is used in automotive finishing and general industrial painting, generally one which imparts color and/or an effect. This basecoat material is generally applied to a metallic or plastics substrate which has been pretreated with surfacer or primer-surfacer, or else, occasionally, directly to the plastics substrate. Substrates used may also include existing paint systems, which may optionally require pretreatment as well (by abrading, for example). It has now become entirely customary to apply more than one basecoat film. Accordingly, in such a case, a first basecoat film constitutes the substrate for a second such film. To protect a basecoat film from environmental effects in particular, at least one additional clearcoat film is applied over it.

The Method of the Invention and the Multicoat Paint System of the Invention

The present invention likewise provides a method for producing multicoat paint systems, in which
　　(1) an aqueous basecoat material is applied to a substrate,
　　(2) a polymer film is formed from the coating material applied in stage (1),
　　(3) a clearcoat material is applied to the resulting basecoat film, and then
　　(4) the basecoat film is cured together with the clearcoat film,
which is characterized in that the aqueous basecoat material used in stage (1) is a coating material of the invention.

All of the above remarks regarding the coating composition of the invention also apply to the method of the invention. This is also true especially of all the preferred, more preferred and most preferred features. Especially preferably, the basecoat material comprises a pigment, i.e. has been pigmented.

Said method is preferably used to produce multicoat color paint systems, effect paint systems, and color and effect paint systems.

The aqueous basecoat material for use in accordance with the invention is commonly applied to metallic or plastics substrates that have been pretreated with surfacer or primer-surfacer. Said basecoat material may also be applied directly to the plastics substrate.

Where a metallic substrate is to be coated, it is preferably further coated with an electrocoat system before the surfacer or primer-surfacer is applied.

Where a plastics substrate is being coated, it is preferably also pretreated before the surfacer or primer-surfacer is applied. The techniques most frequently employed for such pretreatment are those of flaming, plasma treatment, and corona discharge. Flaming is used with preference.

The pigmented aqueous basecoat material of the invention may be applied to a metallic substrate, at the film thicknesses customary within the automobile industry, in the range, for example, of 5 to 100 micrometres, preferably 5 to 60 micrometres. This is done using spray application methods, for example compressed air spraying, airless spraying, high-speed rotation, electrostatic spray application (ESTA), alone or in conjunction with hot spray application, for example hot air spraying.

Following the application of the pigmented aqueous basecoat material, it can be dried by known methods. For example, (1-component) basecoat materials, which are preferred, can be flashed at room temperature for 1 to 60 minutes and subsequently dried, preferably at optionally slightly elevated temperatures of 30 to 90° C. Flashing and drying in the context of the present invention mean the evaporation of organic solvents and/or water, as a result of which the paint becomes drier but has not yet cured or not yet formed a fully crosslinked coating film.

Then a commercial clearcoat material is applied, by likewise common methods, the film thicknesses again being within the customary ranges, for example 5 to 100 micrometres. Preference is given to two-component clearcoat materials.

Following application of the clearcoat material, it may be flashed off at room temperature for 1 to 60 minutes, for example, and optionally dried. The clearcoat material is then cured together with the applied basecoat material. In the course of these procedures, crosslinking reactions occur, for example, to produce on a substrate a multiple-coat color and/or effect paint system of the invention. The curing is preferably effected by thermal means, at temperatures of 60 to 200° C.

All the film thicknesses stated in the context of the present invention should be understood as dry film thicknesses. The film thickness is thus that of the cured film in question. Thus, if it is stated that a coating material is applied in a particular film thickness, this should be understood to mean that the coating material is applied such that the stated film thickness results after the curing.

Plastics substrates are coated basically in the same way as metallic substrates. However, curing is effected here generally at much lower temperatures of 30 to 90° C., in order not to cause any damage to and/or deformation of the substrate.

The method of the invention can thus be used to paint metallic and nonmetallic substrates, more particularly plastics substrates, preferably automobile bodies or components thereof.

The method of the invention can be used further for dual finishing in OEM finishing. This means that a substrate which has been coated by means of the method of the invention is painted for a second time, likewise by means of the method of the invention.

The invention relates further to multicoat paint systems which are producible by the method described above. These multicoat paint systems are to be referred to below as multicoat paint systems of the invention.

All the above remarks relating to the aqueous coating composition of the invention and the method of the invention also apply correspondingly to said multicoat paint system. This is also true especially of all the preferred, more preferred and most preferred features.

The multicoat paint systems of the invention are preferably multicoat color paint systems, effect paint systems, and color and effect paint systems.

A further aspect of the invention relates to the method of the invention, wherein said substrate from stage (1) is a multicoat paint system having defects. This substrate/multicoat paint system having defects is thus an original finish, which is to be repaired ("spot repair") or completely recoated ("dual coating").

The method of the invention is accordingly also suitable for repairing defects on multicoat paint systems. Film defects are generally faults on and in the coating, usually named according to their shape or their appearance. The skilled person is aware of a host of possible kinds of such film defects. They are described for example in Römpp-Lexikon Lacke and Druckfarben, Georg Thieme Verlag, Stuttgart, New York, 1998, page 235, "Film defects".

In addition, the present invention relates to the use of the aqueous coating composition for improving the stability of multicoat paint systems to visual defects, especially pinholes. Thus, if the aqueous coating compositions of the invention are used in the painting of metallic and plastic substrates, the use thereof leads particularly to an improvement in the stability of the built-up paint system to pinholes. This is especially true when the aqueous coating material of the invention is used as a basecoat material and the method of the invention is used to build up a multicoat paint system of the invention.

Stability to pinholes can be tested by known methods. Particular options are the pinhole limit already elucidated at the outset, and the number of pinholes for a given film thickness as evidence of stability to pinholes.

The invention is illustrated below using examples.

EXAMPLES

Specification of Particular Components and Measurement Methods

Dimer Fatty Acid:

The dimer fatty acid used contains less than 1.5% by weight of trimeric molecules, 98% by weight of dimeric molecules, and less than 0.3% by weight of fatty acid (monomer). It is prepared on the basis of linolenic, linoleic, and oleic acids (Pripol™ 1012-LQ-(GD) (from Croda)).

Polyester 1 (P1):

Prepared as per example D, column 16 lines 37 to 59 of DE 4009858 A. The corresponding polyester solution has a solids content of 60% by weight, the solvent used being butyl glycol rather than butanol, so the solvents present are primarily butyl glycol and water.

Determination of the Number-Average Molecular Weight:

The number-average molecular weight was determined by means of vapor pressure osmosis. Measurement was effected using a vapor pressure osmometer (model 10.00 from Knauer) on concentration series of the component under investigation in toluene at 50° C., with benzophenone as calibration substance for determination of the experimental calibration constant of the measuring instrument employed (in accordance with E. Schröder, G. Müller, K.-F. Arndt, "Leitfaden der Polymercharakterisierung", Akademie-Verlag, Berlin, pp. 47-54, 1982, in which benzil was used as calibration substance).

Preparation of a Copolymer (CP) for Use in Accordance with the Invention

A copolymer (CP) or an aqueous dispersion comprising said polymer was prepared as follows:

a) A dispersion of an alpha-methylstyryl-containing polyurethane was prepared on the basis of the patent DE 19948004 B4, page 27, example 1, "Herstellung eines erfindungsgemäßen Polyurethans (B)" ["Preparation of a polyurethane (B) of the invention"], except with additional use of trimethylolpropane and with a solids content of the resulting dispersion of only 29% rather than 35.1% by weight. Based on the adduct (B2) mentioned in the patent DE 19948004 B4, preparation example 1, an adduct was prepared with monoethanolamine rather than with diethanolamine:

For this purpose, a reaction vessel equipped with stirrer, internal thermometer, reflux condenser and electrical heater was first initially charged, under nitrogen, with 200.0 parts by weight of methyl ethyl ketone, 800.0 parts by weight of N-methylpyrrolidone and 221.3 parts by weight of monoethanolamine (from BASF SE) at 20° C. To this mixture were added dropwise, over the course of one and a half hours, 778.7 parts by weight of 1-(1-isocyanato-1-methylethyl)-3-(1-methyl ethenyl)benzene (TMI® (META) Unsaturated Aliphatic Isocyanate, from Cytec) having an isocyanate content of 20.4% by weight of isocyanate, such that the reaction temperature did not exceed 40° C. The resulting reaction mixture was stirred until no free isocyanate groups were detectable any longer. Thereafter, the reaction mixture was stabilized with 200 ppm of hydroquinone.

The theoretical solids content of the solution of the described adduct prepared in this way was 50% by weight.

Then, in a further reaction vessel equipped with stirrer, internal thermometer, reflux condenser and electrical heater, 431.7 parts by weight of a linear polyester polyol and 69.7 parts by weight of dimethylolpropionic acid (from GEO Specialty Chemicals) were dissolved in 355.8 parts by weight of methyl ethyl ketone and 61.6 parts by weight of N-methylpyrrolidone under nitrogen. The linear polyester polyol had been prepared beforehand from dimerized fatty acid (Pripol® 1012, from Uniqema), isophthalic acid (from BP Chemicals) and hexane-1,6-diol (from BASF SE) (weight ratio of the starting materials: dimeric fatty acid to isophthalic acid to hexane-1,6-diol=54.00:30.02:15.98) and had a hydroxyl number of 73 mg KOH/g solids and a number-average molar mass of 1379 g/mol. Added to the resulting solution at 45° C. were 288.6 parts by weight of isophorone diisocyanate (Basonat® I, from BASF SE) having an isocyanate content of 37.75% by weight. After the exothermic reaction had abated, the reaction mixture was heated gradually to 80° C. while stirring. Stirring was continued at this temperature until the isocyanate content of the solution was constant at 3.2% by weight. Thereafter, the reaction mixture was cooled to 65° C., and 85.2 parts by weight of the above-described adduct were added together with 21.8 parts by weight of trimethylolpropane (from BASF SE). The resulting reaction mixture was stirred at 65° C. until the isocyanate content of the solution had fallen to 1.0% by weight. Now 22.2% by weight of the diethanolamine (from BASF SE) were added and the content of isocyanate groups was monitored until no free isocyanate groups were detectable any longer. The resulting dissolved polyurethane was admixed with 139.7 parts by weight of methoxypropanol and 43.3 parts by weight of triethylamine (from BASF SE). 30 minutes after the addition of amine, the temperature of the solution was lowered to 60° C., after which 1981 parts by weight of deionized water were added while stirring over the course of 30 minutes. The methyl ethyl ketone was distilled out of the resulting dispersion at 60° C. under reduced pressure. Thereafter, any losses of solvent and water were compensated for.

The dispersion of an alpha-methylstyryl-containing polyurethane thus obtained had a solids content of 29.0% by weight, the acid number was 34.0 mg KOH/g solids, and the pH was 7.0 (measured at 23° C.).

b) To prepare the aqueous primary dispersion of the copolymer (CP) of the invention, under a nitrogen atmosphere, 1961.2 parts by weight of the alpha-methylstyryl-containing polyurethane dispersion according to a) were diluted with 40.0 parts by weight of methoxypropanol (0.07% based on polyurethane) and 686.5 parts by weight of deionized water, and heated to 80° C. After the reactor contents had been heated to 80° C., 0.6 part by weight of ammonium peroxodisulfate, dissolved in 35.7 parts by weight of deionized water, were introduced into the reactor under standard pressure. Subsequently, with continued stirring, a mixture of 301.6 parts by weight of methyl methacrylate, 261.6 parts by weight of n-butyl acrylate, 5.6 parts by weight of allyl methacrylate (0.87 mol % based on total vinyl monomer) and 134.9 parts by weight of N-methylpyrrolidone was added homogeneously over the course of five hours. With commencement of the addition of the monomer mixture, a solution of 1.1 parts by weight of ammonium peroxodisulfate in 71.3 parts by weight of deionized water was likewise added within five hours.

During the free-radical polymerization, every 30 minutes, the content of free monomers was determined by means of gas chromatography (GC) (GC: once with 50 m silica capillary column with polyethylene glycol phase and once with 50 m silica capillary column with polydimethylsiloxane phase, carrier gas: helium, split injector 150° C., oven temperature 40-220° C., flame ionization detector, detector temperature 275° C., internal standard: isobutyl acrylate), and the highest total monomer content based on dispersion of 0.5% by weight was found after 30 min (3.1% by weight based on the total amount of olefinically unsaturated monomers used for polymerization).

After the simultaneous end of the metered addition of monomer and initiator, the resulting reaction mixture was stirred at 80° C. for a further hour and then cooled to room temperature.

The resulting primary dispersion of the copolymer had a very good storage stability. The solids content thereof was 32.5% by weight, the acid number was 18.8 mg KOH/g solids, and the pH thereof was 7.0. The particle size (z average) by means of photon correlation spectroscopy was 96 nm. By means of gas chromatography (GC: once with 50 m silica capillary column with polyethylene glycol phase and once with 50 m silica capillary column with polydimethylsiloxane phase, carrier gas: helium, split injector 250° C., oven temperature 40-220° C., flame ionization detector, detector temperature 275° C., internal standard: n-propyl glycol), a content of 2.7% by weight of methoxypropanol and 5.7% by weight of N-methylpyrrolidone was found.

After the extraction of the freeze-dried polymer by means of tetrahydrofuran, the gel content was found gravimetrically to be 80.3% by weight. For this purpose, the dispersion was freeze-dried and the mass of the freeze-dried polymer was determined, and then the polymer was extracted in an excess of tetrahydrofuran (ratio of tetrahydrofuran to freeze-dried copolymer=300:1) at 25° C. for 24 hours. The insoluble content (gel content) was isolated, dried at 50° C. in an air circulation oven for 4 hours, and then re-weighed.

Preparation of a Reaction Product (R) for Use in Accordance with the Invention

In a 4 l stainless steel reactor equipped with anchor stirrer, thermometer, condenser, thermometer for overhead temperature measurement and water separator, 2000.0 g of linear diolic PolyTHF1000 (2 mol), 579.3 g of dimer fatty acid (1 mol) and 51 g of cyclohexane were heated to 100° C. in the presence of 2.1 g of di-n-butyltin oxide (Axion® CS 2455, from Chemtura). Heating was continued gently until the onset of the condensation. With a maximum overhead temperature of 85° C., heating was then continued in steps up to 220° C. The progress of the reaction was monitored via the determination of the acid number. When an acid number of ≤3 mg KOH/g was reached, cyclohexane still present was removed by vacuum distillation. A viscous resin was obtained.

Amount of condensate (water): 34.9 g
Acid number: 2.7 mg KOH/g
Solids content (60 min at 130° C.): 100.0%
Molecular weight (vapor pressure osmosis):
Mn: 2200 g/mol
Viscosity: 5549 mPas,
(measured at 23° C. using a rotational viscometer from Brookfield, model CAP 2000+, spindle 3, shear rate: 1333 s$^{-1}$)

Production of Aqueous Basecoat Materials

1. Production of a Comparative Waterborne Basecoat Material 1

The components listed under "aqueous phase" in table A were stirred together in the order stated to form an aqueous mixture. In the next step an organic mixture was prepared from the components listed under "organic phase". The organic mixture was added to the aqueous mixture. The combined mixture was then stirred for 10 minutes and adjusted, using deionized water and dimethylethanolamine, to a pH of 8 and to a spray viscosity of 58 mPas under a shearing load of 1000 s$^{-1}$ as measured with a rotary viscometer (Rheomat RM 180 instrument from Mettler-Toledo) at 23° C.

TABLE A

| Waterborne basecoat material 1 | |
|---|---|
| Component | Parts by weight |
| Aqueous phase | |
| 3% Na—Mg sheet silicate solution | 26.2 |
| Deionized water | 9.87 |
| Butyl glycol | 5.3 |
| Polyester P1 | 5.6 |
| 3% by weight aqueous Rheovis ® AS S130 solution; rheological agent, available from BASF, in water | 6.2 |
| Melamine-formaldehyde resin (Luwipal ® 052 from BASF SE) | 5.65 |
| 10% strength dimethylethanolamine in water | 0.7 |
| Polyurethane-modified polyacrylate; prepared as per page 7 line 55 to page 8 line 23 of DE 4437535 A1 | 3.9 |
| Pluriol ® P 900 from BASF SE | 1.1 |
| Byk-347 ® from Altana | 0.5 |
| Copolymer dispersion (CP) prepared as described above | 6.63 |
| Acrylated polyurethane dispersion (binder dispersion A as per WO 91/15528) | 4.4 |
| Red paste | 7.4 |
| Carbon black paste | 6.8 |

TABLE A-continued

| Waterborne basecoat material 1 | |
|---|---|
| Component | Parts by weight |
| 2-Ethylhexanol | 1 |
| Tributoxyethyl phosphate | 1 |
| Paliocrom dispersion | 2.25 |
| Mica dispersion | 3.8 |
| Organic phase | |
| Aluminum pigment, available from Altana-Eckart | 0.45 |
| Butyl glycol | 0.5 |
| Copolymer dispersion (CP) prepared as described above | 0.75 |

Production of the Red Paste:

The red paste was produced from 40 parts by weight of an acrylated polyurethane dispersion produced as per international patent application WO 91/15528, binder dispersion A, 34.5 parts by weight of Cinilex® DPP Red, 2 parts by weight of a commercial polyether (Pluriol® P900 from BASF SE), 3 parts by weight of 1-propoxy-2-propanol and 20.5 parts by weight of deionized water.

Production of the Carbon Black Paste:

The carbon black paste was produced from 25 parts by weight of an acrylated polyurethane dispersion produced as per international patent application WO 91/15528, binder dispersion A, 10 parts by weight of carbon black, 0.1 part by weight of methyl isobutyl ketone, 1.36 parts by weight of dimethylethanolamine (10% in demineralized water), 2 parts by weight of a commercial polyether (Pluriol® P900 from BASF SE) and 61.45 parts by weight of deionized water.

Production of the Paliocrom Dispersion:

The Paliocrom dispersion was obtained by mixing, using a stirrer unit, 0.75 part by weight of butyl glycol, 0.75 part by weight of the copolymer dispersion (CP) produced as described above, and 0.75 parts by weight of the commercial Paliocrom Orange L 2804 from BASF SE.

Production of the Mica Dispersion:

The mica dispersion was obtained by mixing, using a stirrer unit, 2 parts by weight of butyl glycol, 1.35 parts by weight of a mixed coating material produced as per EP 1534792-B1, column 11 lines 1-17 (without aluminum paste), and 0.45 parts by weight of the commercial mica Mearlin Ext. Super Copper 359Z from Merck.

1.1 Production of a Comparative Waterborne Basecoat Material 2

Waterborne basecoat material 2 was produced analogously to table A, except that the reaction product (R) produced as described above was used in place of the polyester P1. The different amounts of butyl glycol in the waterborne basecoat material 2, caused by the different solids content of the dispersion containing P1 and the reaction product R obtained, were compensated for by appropriate addition of butyl glycol.

1.2 Production of a Waterborne Basecoat Material I1 of the Invention

Waterborne basecoat material I1 was produced analogously to comparative waterborne basecoat material 2, except that a polyurethane resin (X) was used in place of the acrylated polyurethane dispersion (binder dispersion A as per WO 91/15528). The preparation of the polyurethane resin (X) is guided by WO 92/15405, page 14 line 13 to page 15 line 13. The resin has an acid number of 25 mg KOH/g and a number-average molecular weight of 12 000 g/mol. The different amounts of water in the waterborne basecoat material I1, caused by the different solids content of the binder dispersion A as per WO 91/15528 and the dispersion comprising the polyurethane resin (X), were compensated for by a correspondingly smaller addition of water (see position 2 in table A).

1.3 Production of a Waterborne Basecoat Material I2 of the Invention

The production was analogous to that of the waterborne basecoat material I1, except that a different polyurethane resin (X) was used. The preparation of the polyurethane resin used in waterborne basecoat material I2 is guided by WO 92/15405, page 15 lines 23 to 28. The resin has an acid number of 25 mg KOH/g and a number-average molecular weight of 5000 g/mol.

1.4 Production of a Waterborne Basecoat Material I3 of the Invention

The production was analogous to that of the waterborne basecoat material I1, except that a different polyurethane resin (X) was used. The preparation of the polyurethane resin used in waterborne basecoat material I3 is guided by WO 92/15405, page 15 lines 16 to 20. The resin has an acid number of 20 mg KOH/g and a number-average molecular weight of 11 000 g/mol.

Comparison Between Waterborne Basecoat Materials 1, 2 and I1 to I3

To determine the pinhole limit and pinhole count, multi-coat paint systems were produced by the following general method:

A steel sheet of dimensions 30×50 cm was provided with an adhesive strip on one longitudinal edge, in order to be able to determine the film thickness differences after the coating. The particular waterborne basecoat material was applied electrostatically in wedge format. The resulting waterborne basecoat film was flashed off at room temperature for one minute and subsequently dried in an air circulation oven at 70° C. for 10 minutes. A customary two-component clearcoat material was applied pneumatically in a film thickness of 35 to 45 micrometres to the dried waterborne basecoat film. The resulting clearcoat film was flashed off at room temperature for 20 minutes. The waterborne basecoat film and the clearcoat film were then cured in an air circulation oven at 140° C. for 20 minutes. After the visual assessment of the pinholes in the resulting multicoat paint system in wedge format, the film thickness of the pinhole limit was determined. The results can be found in table 1.

TABLE 1

Pinhole limit and pinhole count for waterborne basecoat materials 1, 2 and I1 to I3

| WBM | Pinhole limit (micrometers) | Pinhole count |
|---|---|---|
| 1 | 10 | 161 |
| 2 | 21 | 54 |
| I1 | 28 | 31 |
| I2 | 26 | 37 |
| I3 | 25 | 24 |

The results confirm that the use of a coating composition of the invention as a base coat material in the production of the multicoat paint systems distinctly increases the stability of these multicoat paint systems to pinholes.

The invention claimed is:

1. An aqueous coating composition, comprising:
   at least one aqueous dispersion comprising at least one copolymer (CP) obtained by
   (i) charging an aqueous dispersion comprising at least one polyurethane (A), and then
   (ii) polymerizing a mixture of olefinically unsaturated monomers in the presence of the polyurethane (A) from (i),
   wherein
   (a) a water soluble initiator initiates the polymerizing,
   (b) the olefinically unsaturated monomers are added to the aqueous dispersion such that a concentration of 6.0% by weight based on the total amount of olefinically unsaturated monomers polymerizing, in the aqueous dispersion is not exceeded over the entire reaction time, and
   (c) the mixture of the olefinically unsaturated monomers comprises at least one polyolefinically unsaturated monomer;
   at least one linear hydroxyl-functional reaction product (R) having an acid number less than 20 mg KOH/g, obtained by reacting at least one compound (v) comprising two functional groups (v.a) and an aliphatic or araliphatic hydrocarbyl radical (v.b) which is arranged between the functional groups and has 12 to 70 carbon atoms; and
   at least one polyurethane resin (X), obtained by reacting at least one compound (x.1) comprising at least one carboxylic acid group and at least one group reactive toward isocyanate groups.

2. The coating composition according to claim 1, wherein the mixture of olefinically unsaturated monomers comprises 0.1 to 6.0 mol % of polyolefinically unsaturated monomers.

3. The coating composition according to claim 1, wherein:
   the mixture of olefinically unsaturated monomers comprises allyl methacrylate; and
   no further polyolefinically unsaturated monomers are present.

4. The coating composition according to claim 1, wherein the functional groups (v.a) in the at least one compound (v) are selected from the group consisting of hydroxyl groups, carboxyl groups, and mixtures thereof.

5. The coating composition according to claim 1, wherein dimeric fatty acids, dimer diols, or both are reacted as the compound (v) in the preparation of the reaction product (R).

6. The coating composition according to claim 1, wherein:
   the reaction product (R) is obtained by reacting at least one dimer fatty acid with at least one aliphatic, araliphatic, and/or aromatic dihydroxy-functional compound having a number-average molecular weight of 120 to 6000 g/mol; and
   the dihydroxy-functional compounds are selected from the group consisting of polyether diols, polyester diols, dimer diols, and mixtures thereof.

7. The coating composition according to claim 1, wherein the at least one reaction product (R) is selected from the group consisting of:
   reaction products obtained by reacting dimer fatty acids with at least one aliphatic dihydroxy-functional compound of the general structural formula (I):

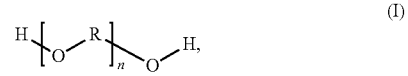

(I)

wherein

R is a $C_3$ to $C_6$ alkylene radical, n is correspondingly such that the compound of the formula (I) has a number-average molecular weight of 120 to 6000 g/mol, the dimer fatty acids and the compounds of the formula (I) are reacted in a molar ratio of 0.7/2.3 to 1.6/1.7, and the resulting reaction product has a number-average molecular weight of 600 to 40,000 g/mol and an acid number of less than 10 mg KOH/g;

reaction products obtained by reacting dimer fatty acids with at least one dihydroxy-functional compound of the general structural formula (II):

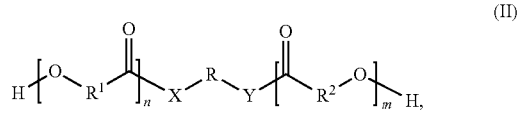

wherein

R is a divalent organic radical comprising 2 to 10 carbon atoms, $R^1$ and $R^2$ are each independently straight-chain or branched alkylene radicals having 2 to 10 carbon atoms, X and Y are each independently O, S or $NR^3$ wherein $R^3$ is hydrogen or an alkyl radical having 1 to 6 carbon atoms, m and n are correspondingly such that the compound of formula (II) has a number-average molecular weight of 450 to 2200 g/mol, the dimer fatty acids and the compounds of formula (II) are reacted in a molar ratio of 0.7/2.3 to 1.6/1.7, and the resulting reaction product has a number-average molecular weight of 1200 to 5000 g/mol and an acid number of less than 10 mg KOH/g;

reaction products obtained by reacting dimer fatty acids with dimer diols, wherein the dimer fatty acids and dimer diols are reacted in a molar ratio of 0.7/2.3 to 1.6/1.7 and the resulting reaction product has a number-average molecular weight of 1200 to 5000 g/mol and an acid number of less than 10 mg KOH/g; and mixtures thereof.

8. The coating composition according to claim 1, wherein the at least one compound (x.1) reacted for the preparation of the polyurethane resin (X) is selected from the group consisting of a carboxy-functional polyether polyol, a carboxy-functional polyester polyol, a monomeric monocarboxylic acid containing two hydroxyl groups, and mixtures thereof.

9. The coating composition according to claim 1, wherein the polyurethane resin (X) is obtained by reacting at least one alpha,alpha-dimethylolalkanoic acid as the compound (x.1).

10. The coating composition according to claim 9, wherein the at least one alpha,alpha-dimethylolalkanoic acid is selected from the group consisting of 2,2-dimethylolacetic acid, 2,2-dimethylolpropionic acid, 2,2-dimethylolbutyric acid, 2,2-dimethylolpentanoic acid, and mixtures thereof.

11. The coating composition according to claim 1, further comprising:

at least one hydroxyl-functional polymer other than (CP), (R) and (X) as a binder, selected from the group consisting of a polyurethane, a polyester, a polyacrylate, copolymers thereof, and mixtures thereof, a melamine resin as a crosslinking agent, and at least one color pigment, effect pigment, or both.

12. The coating composition according to claim 11, wherein the melamine resin as a crosslinking agent is present in the range of 0.5% to 20% by weight relative to the total weight of the coating composition.

13. The coating composition according to claim 11, wherein the at least one color pigment, effect pigment, or both are present in the range of 1% to 30% by weight relative to the total weight of the coating composition.

14. The coating composition according to claim 1, further comprising:

a thickener present in the range of 0.01% to 5.0% by weight relative to the total weight of the coating composition.

15. A method for producing a multicoat paint system, the method comprising:

(1) applying an aqueous basecoat material to a substrate;

(2) forming a polymer film from the aqueous basecoat material applied in stage (1);

(3) applying a clearcoat material to the polymer film formed from the aqueous basecoat material; and (4) curing the polymer film together with a film formed from the clearcoat material, wherein the aqueous basecoat material applied in stage (1) is the coating composition according to claim 1.

16. The method according to claim 15, wherein:

the substrate is a metallic substrate or a plastic substrate; and the substrate is untreated or has been pretreated or pre-coated.

17. A multicoat paint system obtained by the method according to claim 15.

18. The multicoat paint system of claim 17, which has a film thickness of a pinhole limit of greater than or equal to 25 µm.

19. A method, comprising:

applying the coating composition according to claim 1 to a substrate to obtain a multicoat paint system product, wherein the multicoat paint system product has improved stability to visual defects compared to a product not coated with the coating composition.

20. The method according to claim 19, wherein the method increases a film thickness of a pinhole limit of the multicoat paint system product by at least 4 µm.

* * * * *